US011340080B2

United States Patent
Averilla

(10) Patent No.: US 11,340,080 B2
(45) Date of Patent: May 24, 2022

(54) AUTOMATIC ANNOTATION OF ENVIRONMENTAL FEATURES IN A MAP DURING NAVIGATION OF A VEHICLE

(71) Applicant: Motional AD LLC, Boston, MA (US)

(72) Inventor: Paul Stephen Rempola Averilla, Singapore (SG)

(73) Assignee: Motional AD LLC, Boston, MA (US)

( * ) Notice: Subject to any disclaimer, the term of this patent is extended or adjusted under 35 U.S.C. 154(b) by 134 days.

(21) Appl. No.: 16/656,919

(22) Filed: Oct. 18, 2019

(65) Prior Publication Data
US 2020/0132477 A1 Apr. 30, 2020

Related U.S. Application Data

(60) Provisional application No. 62/752,299, filed on Oct. 29, 2018, provisional application No. 62/802,677, filed on Feb. 7, 2019.

(51) Int. Cl.
*G01C 21/32* (2006.01)
*G01S 17/89* (2020.01)
(Continued)

(52) U.S. Cl.
CPC ............ *G01C 21/32* (2013.01); *G01C 21/16* (2013.01); *G01S 17/89* (2013.01); *G01S 19/42* (2013.01);
(Continued)

(58) Field of Classification Search
CPC ............... G01C 21/32; G01C 21/3867; G01C 21/3602; G01C 21/3804; G06F 16/29;
(Continued)

(56) References Cited

U.S. PATENT DOCUMENTS

2014/0309833 A1 10/2014 Ferguson et al.
2015/0268058 A1* 9/2015 Samarasekera ...... G08G 5/0073
701/409
(Continued)

FOREIGN PATENT DOCUMENTS

CN 104281709 1/2015
CN 105069395 11/2015
(Continued)

OTHER PUBLICATIONS

[No Author Listed] SAE International: Taxonomy and Definitions for Terms Related to Driving Automation Systems for On-Road Motor Vehicles, Sep. 2016, 30 pages.
DK 1rst Technical Examination in Danish Appln. No. PA 201970128, dated May 8, 2019, 9 pages.
Noh et al., "High-Level Data Fusion Based Probabilistic Situation Assessment for Highly Automated Driving," 2015 IEEE 18th International Conference on Intelligent Transportation Systems, Nov. 2, 2015, pp. 1587-1594.
(Continued)

*Primary Examiner* — Tan Q Nguyen
(74) *Attorney, Agent, or Firm* — Fish & Richardson P.C.

(57) ABSTRACT

Among other things, we describe techniques for automatic annotation of environmental features in a map during navigation of a vehicle. The techniques include receiving, by the vehicle located within an environment, a map of the environment. Sensors of the vehicle receive sensor data and semantic data. The sensor data includes a plurality of features of the environment. A geometric model of a feature of the plurality of features is generated. The feature is associated with a drivable area within the environment. A drivable segment is extracted from the drivable area. The drivable segment is segregated into a plurality of geometric blocks, wherein each geometric block corresponds to a characteristic of the drivable area and the geometric model of the feature includes the plurality of geometric blocks. The geometric model is annotated using the semantic data. The annotated geometric model is embedded within the map.

17 Claims, 18 Drawing Sheets

(51) Int. Cl.
*G01S 19/42* (2010.01)
*G06T 17/05* (2011.01)
*G06T 19/00* (2011.01)
*G01C 21/16* (2006.01)
*H01L 27/11* (2006.01)

(52) U.S. Cl.
CPC .............. *G06T 17/05* (2013.01); *G06T 19/00* (2013.01); *G06T 2219/004* (2013.01)

(58) Field of Classification Search
CPC . H01L 27/11; H01L 27/1157; H01L 27/11551
See application file for complete search history.

(56) References Cited

U.S. PATENT DOCUMENTS

| | | | |
|---|---|---|---|
| 2016/0035081 | A1 | 2/2016 | Stout et al. |
| 2017/0270361 | A1 | 9/2017 | Puttagunta et al. |
| 2018/0120857 | A1 | 5/2018 | Kappauf et al. |
| 2018/0188044 | A1 | 7/2018 | Wheeler |
| 2018/0188060 | A1 | 7/2018 | Wheeler |
| 2018/0210087 | A1 | 7/2018 | Olson et al. |
| 2018/0232947 | A1 | 8/2018 | Nehmadi et al. |
| 2018/0275277 | A1 | 9/2018 | Li et al. |
| 2018/0275658 | A1 | 9/2018 | Iandola et al. |
| 2019/0113916 | A1 | 4/2019 | Guo et al. |
| 2019/0147582 | A1* | 5/2019 | Lee .................. G06T 11/00 382/156 |
| 2019/0243372 | A1* | 8/2019 | Huval ............... B60W 30/0953 |
| 2020/0133272 | A1 | 4/2020 | Chong |

FOREIGN PATENT DOCUMENTS

| | | |
|---|---|---|
| CN | 105096386 | 11/2015 |
| CN | 106503653 | 3/2017 |
| CN | 106571038 | 4/2017 |
| CN | 107168334 | 9/2017 |
| CN | 107992829 | 5/2018 |
| CN | 108196535 | 6/2018 |
| CN | 108221731 | 6/2018 |
| WO | WO 2016/118672 | 7/2016 |
| WO | WO 2016130719 | 8/2016 |
| WO | WO 2017079341 | 5/2017 |

OTHER PUBLICATIONS

U.S. Appl. No. 16/656,948, filed Oct. 18, 2019, Chong.
EP Extended Search Report in European Appln. No. 19205572,1, dated Apr. 2, 2020, 9 pages.
Kummerle et al., "Autonomous Driving in a Multi-level Parking Structure," 2009 IEEE International Conference on Robotics and Automation, Kobe, Japan, May 12-17, 2009, 3395-3400.
Thrun, "Toward Robotic Cars," Communications of the ACM, Apr. 1, 2010, 4; 99-108.
[No Author Listed] [online], "03 Webinar 3 II Sensor Fusion-Semantic Map as Sensor," Civil Maps, dated Jun. 28, 2017, retrieved on Feb. 26, 2020 <https://www.youtube.com/watch?v=z2WMvNd1JVE>, 1 page [Video Submission].
[No Author Listed] [online], "Disrupting autonomous vehicle mapping and . . . ;" AutoSens, dated Sep. 11, 2018 retrieved on Feb. 26, 2020, <https://www.youtube.com/watch?v=mDn1zeiuznE >, 1 page [Video Submission].
DK 2nd Technical Examination in Danish Appln. No. PA 201970128, dated Jan. 23, 2020, 3 pages.
DK 3rd Technical Examination in Danish Appln. No. PA 201970128, dated Sep. 16, 2020, 3 pages.
DK Fourth Technical Examination in Danish Appln. No. PA 201970128, dated Mar. 11, 2021, 4 pages.
Liu et al., "Detecting Drivable Area for Self-driving Cars: An Unsupervised Approach," Computer Vision and Pattern Recognition, May 1, 2017, 6 pages.
DK Fifth Office Action in Danish Appln. No. PA 201970128, dated Jun. 29, 2021, 2 pages.
EP Extended Search Report in European Appln. No. 19205551.5, dated Apr. 2, 2020, 9 pages.
Liu et al. "A co-point mapping-based approach to drivable area detection for self-driving cars." Engineering, Aug. 1, 2018, 4(4):479-90.
Liu et al., "Detecting drivable area for self-driving cars: An unsupervised approach," arXiv, May 1, 2017, 1705.00451, 6 pages.
Liu et al., "Research and implementation of road network fusion with combined semantics and geometry," Surveying and Spatial Geographic Information, Jan. 2017, 40(7), 1 page (abstract only).

* cited by examiner

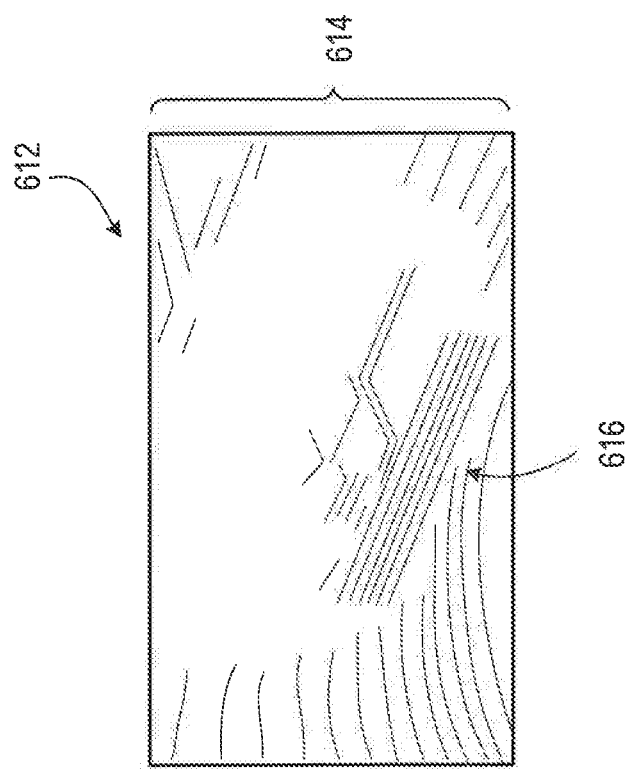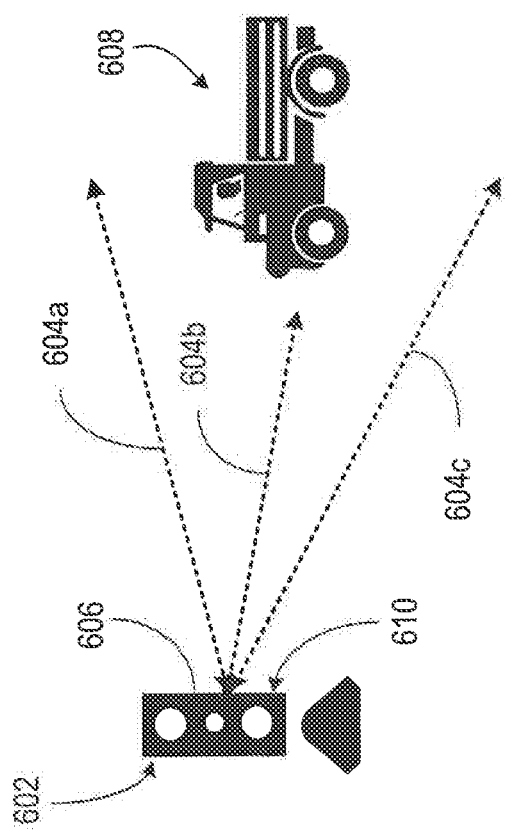
FIG. 6

AUTOMATIC ANNOTATION OF ENVIRONMENTAL FEATURES IN A MAP DURING NAVIGATION OF A VEHICLE

CROSS-REFERENCE TO RELATED APPLICATIONS

This application claims the benefit of U.S. Provisional Application 62/752,299, filed on Oct. 29, 2018, and U.S. Provisional Application 62/802,677, filed on Feb. 7, 2019, both of which are incorporated herein by reference in their entirety.

FIELD OF THE INVENTION

This description relates generally to navigation planning for vehicles and specifically to automatic annotation of environmental features in a map during navigation of a vehicle.

BACKGROUND

Autonomous vehicles (AVs) have the potential to transform transportation systems by reducing road fatalities, traffic congestion, parking congestion, and fuel efficiency. However, conventional methods for navigation of AVs often rely on traditional static maps and are insufficient for precise localization of an AV. Conventional methods for static map generation may not address the problem of changing environmental features and dynamic road conditions. Moreover, traditional mapping methods might not scale to large environments such as cities or states.

SUMMARY

Techniques are provided for automatic annotation of environmental features in a map during navigation of a vehicle. The techniques include receiving, using one or more processors of a vehicle located within an environment, a map of the environment. One or more sensors of the vehicle receive sensor data and semantic data. The sensor data includes a plurality of features of the environment. From the sensor data, a geometric model is generated of a feature of the plurality of features. The generating includes associating the feature with a drivable area within the environment. A drivable segment is extracted from the drivable area. The drivable segment is segregated into a plurality of geometric blocks. Each geometric block corresponds to a characteristic of the drivable area and the geometric model of the feature includes the plurality of geometric blocks. The geometric model is annotated using the semantic data. The annotated geometric model is embedded within the map.

In one embodiment, one or more sensors of a vehicle located within an environment are used to generate sensor data including a feature of the environment. Using the sensor data, the feature is mapped to a drivable area within a map of the environment. Using the drivable area within the map, a polygon is extracted including a plurality of geometric blocks. Each geometric block corresponds to a drivable segment of the drivable area. Using semantic data extracted from the drivable area within the map, the polygon is annotated. Using one or more processors of the vehicle, the annotated polygon is embedded within the map.

In one embodiment, the sensor data includes LiDAR point cloud data.

In one embodiment, the one or more sensors includes a camera and the sensor data further includes an image of the plurality of features of the environment.

In one embodiment, the vehicle is located at a spatiotemporal location within the environment and the plurality of features is associated with the spatiotemporal location.

In one embodiment, the feature represents a plurality of lanes of the drivable area orientated in the same direction and each geometric block of the plurality of geometric blocks represents a single lane of the drivable area.

In one embodiment, the feature represents an elevation of the drivable area, a curb located adjacent to the drivable area, or a median separating two lanes of the drivable area.

In one embodiment, the drivable area includes a road segment, a parking space located on the road segment, a parking lot connected to the road segment, or a vacant lot located within the environment.

In one embodiment, the one or more sensors include a global navigation satellite system (GNSS) sensor or an inertial measurement unit (IMU). The method further includes determining, using the sensor data, a spatial location of the vehicle relative to a boundary of the drivable area.

In one embodiment, the generating of the geometric model includes classifying the LiDAR point cloud data.

In one embodiment, the generating of the geometric model includes superimposing the plurality of geometric blocks onto the LiDAR point cloud data to generate a polygon including a union of geometric blocks of the plurality of geometric blocks.

In one embodiment, the polygon represents a splitting of a lane of the drivable area into a plurality of lanes.

In one embodiment, the polygon represents a merging of a plurality of lanes of the drivable area into a single lane.

In one embodiment, the polygon represents an intersection of a plurality of lanes of the drivable area.

In one embodiment, the polygon represents a roundabout including a spatial location on the drivable area for the vehicle to enter or exit the roundabout.

In one embodiment, the polygon represents a curving of a lane of the drivable area.

In one embodiment, the annotating of the geometric model includes generating a computer-readable semantic annotation that combines the geometric model and the semantic data, the method further including transmitting, to a remote server or another vehicle, the map having the computer-readable semantic annotation.

In one embodiment, the annotating of the geometric model using the semantic data is performed in a first mode of operation, the method further including navigating, using a control module of the vehicle, the vehicle on the drivable area in a second mode of operation using the map.

In one embodiment, the semantic data represents a marking on the drivable area, a road sign located within the environment, or a traffic signal located within the environment.

In one embodiment, the annotating of the geometric model using the semantic data includes extracting, from the semantic data, a logical driving constraint for the vehicle associated with navigating the vehicle along the drivable area.

In one embodiment, the logical driving constraint includes a traffic light sequence, a conditional left or right turn, or a direction of traffic.

In one embodiment, in a second mode of operation, the annotated geometric model is extracted from the map. The navigating of the vehicle includes transmitting a command to a throttle or a brake of the vehicle responsive to the extracting of the annotated geometric model.

In one embodiment, a plurality of operational metrics associated with navigating the vehicle along the drivable area is stored. Using the map, the plurality of operational metrics is updated.

Using the updated plurality of operational metrics, rerouting information is determined for the vehicle. The rerouting information is transmitted to a server or another vehicle located within the environment.

In one embodiment, using a control module of the vehicle, the vehicle is navigated on the drivable area using the determined rerouting information.

In one embodiment, from a second vehicle, a computer-readable semantic annotation of the map is received. The map is merged with the received computer-readable semantic annotation for transmittal to a remote server.

In one embodiment, the embedding the annotated geometric model within the map is performed in a first mode of operation. The method further includes determining, from the annotated geometric model within the map, the drivable area.

In one embodiment, a vehicle includes one or more computer processors. One or more non-transitory storage media store instructions which, when executed by the one or more computer processors, cause performance of any of the embodiments disclosed herein.

In one embodiment, one or more non-transitory storage media store instructions which, when executed by one or more computing devices, cause performance of any of the embodiments disclosed herein.

In one embodiment, a method includes performing a machine-executed operation involving instructions which, when executed by one or more computing devices, cause performance of any of the embodiments disclosed herein. The machine-executed operation is at least one of sending said instructions, receiving said instructions, storing said instructions, or executing said instructions.

In one embodiment, one or more non-transitory storage media store a map of an environment. The map is generated by receiving, using one or more processors of a vehicle located within the environment, the map of the environment. Using one or more sensors of the vehicle, sensor data and semantic data is received. The sensor data includes a plurality of features of the environment. From the sensor data, a geometric model is generated of a feature of the plurality of features. The generating includes associating the feature with a drivable area within the environment. A drivable segment is extracted from the drivable area. The drivable segment is segregated into a plurality of geometric blocks. Each geometric block corresponds to a characteristic of the drivable area and the geometric model of the feature includes the plurality of geometric blocks. The geometric model is annotated using the semantic data. The annotated geometric model is embedded within the map.

In one embodiment, a vehicle includes a communication device configured to receive, using one or more processors of a vehicle located within an environment, a map of the environment. One or more sensors are configured to receive sensor data and semantic data. The sensor data includes a plurality of features of the environment. One or more processors are configured to generate, from the sensor data, a geometric model of a feature of the plurality of features. The generating includes associating the feature with a drivable area within the environment. A drivable segment is extracted from the drivable area. The drivable segment is segregated into a plurality of geometric blocks. Each geometric block corresponds to a characteristic of the drivable area and the geometric model of the feature includes the plurality of geometric blocks. The geometric model is annotated using the semantic data. The annotated geometric model is embedded within the map.

These and other aspects, features, and implementations can be expressed as methods, apparatus, systems, components, program products, means or steps for performing a function, and in other ways.

These and other aspects, features, and implementations will become apparent from the following descriptions, including the claims.

BRIEF DESCRIPTION OF THE DRAWINGS

FIG. 6 illustrates an example of a LiDAR system, in accordance with one or more embodiments.

DETAILED DESCRIPTION

Figure 1:
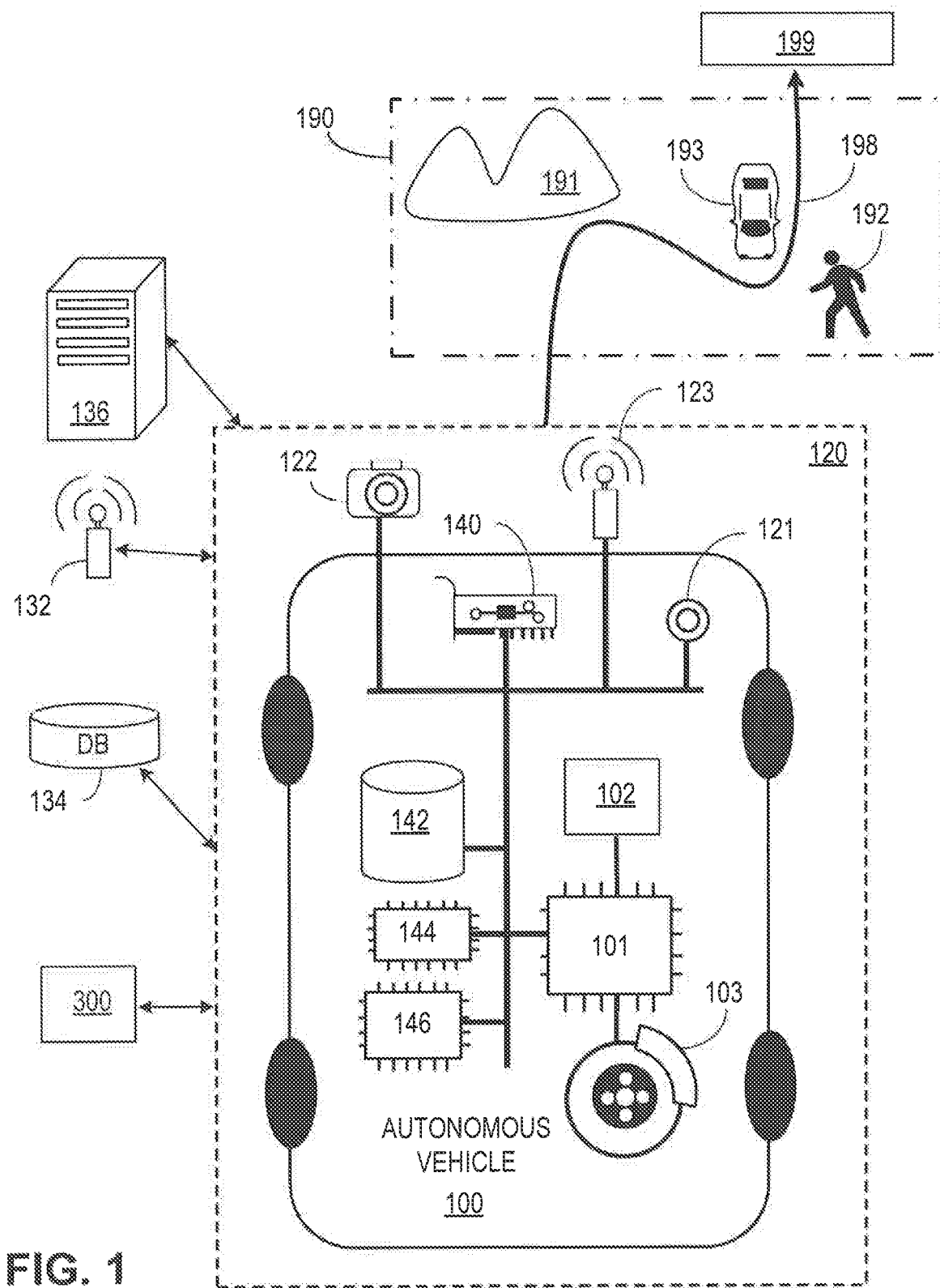
FIG. 1 illustrates an example of an autonomous vehicle (AV) having autonomous capability, in accordance with one or more embodiments.

In the following description, for the purposes of explanation, numerous specific details are set forth in order to provide a thorough understanding of the present invention. It will be apparent, however, that the present invention may be practiced without these specific details. In other instances, well-known structures and devices are illustrated in block diagram form in order to avoid unnecessarily obscuring the present invention.

In the drawings, specific arrangements or orderings of schematic elements, such as those representing devices, modules, instruction blocks and data elements, are illustrated for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. System Overview
3. Autonomous Vehicle Architecture
4. Autonomous Vehicle Inputs
5. Autonomous Vehicle Planning
6. Autonomous Vehicle Control
7. Architecture for Automatic Annotation of Environmental Features in a Map
8. Environment for Automatic Annotation of Environmental Features in a Map
9. Example Automatically Annotated Environmental Features in a Map
10. Example Automatically Annotated Map
11. Process for Automatic Annotation of Environmental Features in a Map General Overview A vehicle annotates a live map of an environment within which the vehicle is navigating. The vehicle annotates the live map by acquiring information about the environment and automatically annotating the information into the live map. The live map is a real-time map or depiction of the environment that represents dynamic environmental changes or conditions. The vehicle accesses portions of the map and updates the portions in real time. To annotate the map, the vehicle receives the map of the environment from a server or another vehicle. The vehicle uses one or more sensors of the vehicle to receive sensor data and semantic data. For example, the sensors may include LiDAR or cameras. The sensor data includes a plurality of features of the environment. Each feature represents one or more characteristics, such as a physical or semantic aspect, of the environment. For example, a feature may model a surface or structure of a curb or road median. From the sensor data, the vehicle generates a geometric model of a feature of the environment. To generate the geometric model, the vehicle associates the feature with a drivable area within the environment. The vehicle extracts a drivable segment from the drivable area. For example, the drivable segment may include a lane of a roadway. The vehicle segregates the extracted drivable segment into a plurality of geometric blocks. Each geometric block corresponds to a characteristic of the drivable area and the geometric model of the feature includes the plurality of geometric blocks. The vehicle annotates the geometric model using the semantic data. The vehicle embeds the annotated geometric model within the live map to update the live map with the changing conditions in the environment. For example, the annotation may notify other vehicles of a new traffic pattern or a new construction zone in the environment.

System Overview

FIG. 1 illustrates an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle and may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings or having two lanes between the lane markings. A lane could also be interpreted in the absence of lane markings. For example, a lane may be defined based on physical features of an environment, e.g., rocks and trees along a thoroughfare in a rural area.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear velocity and acceleration, angular velocity and acceleration, and heading (e.g., an orientation of the leading end of AV 100). Example of sensors 121 are GNSS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Example Cloud Computing Environment

Figure 2:
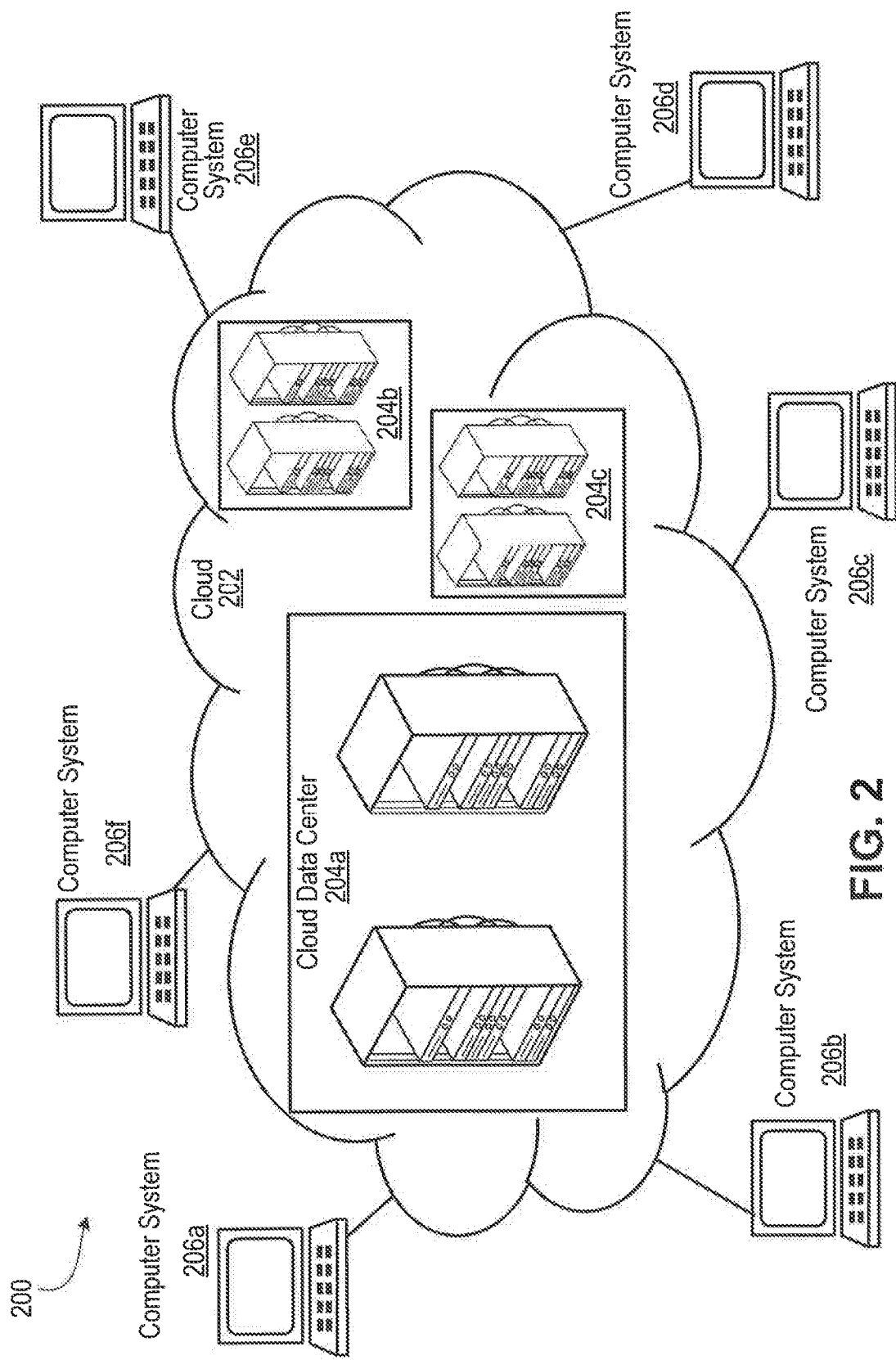
FIG. 2 illustrates an example "cloud" computing environment, in accordance with one or more embodiments.

FIG. 2 illustrates an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a illustrated in FIG. 2, refers to the physical arrangement of servers that make up a cloud, for example the cloud 202 illustrated in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Computer System

Figure 3:
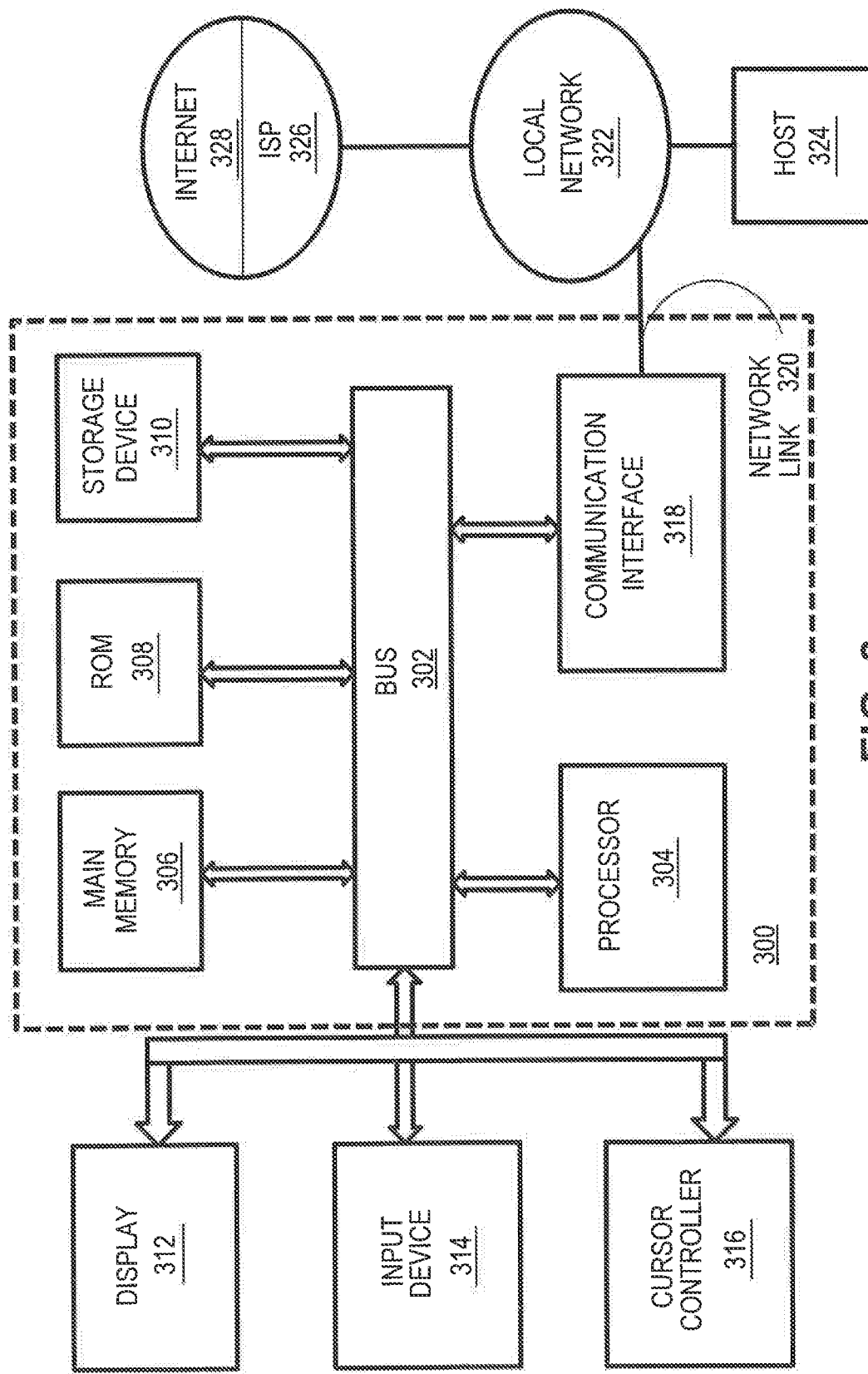
FIG. 3 illustrates a computer system, in accordance with one or more embodiments.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic, or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
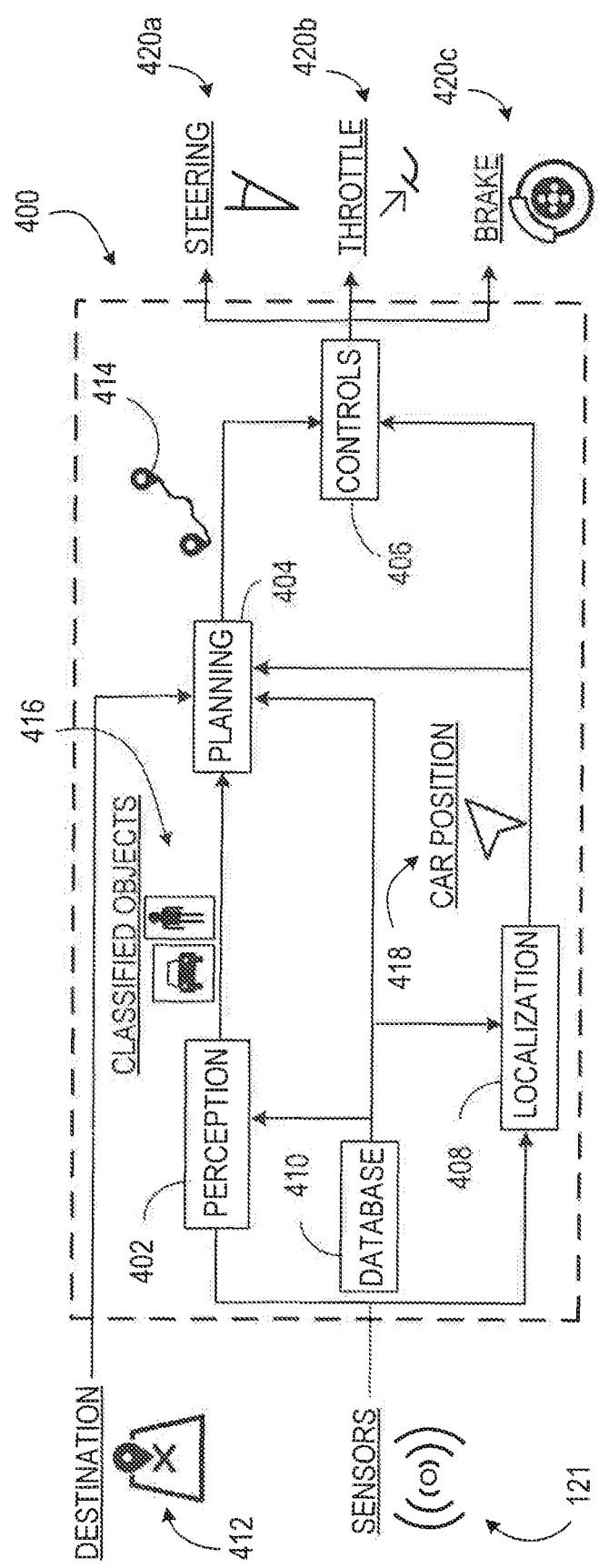
FIG. 4 illustrates an example architecture for an AV, in accordance with one or more embodiments.

FIG. 4 illustrates an example architecture 400 for an autonomous vehicle (e.g., the AV 100 illustrated in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 illustrated in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things).

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also illustrated in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
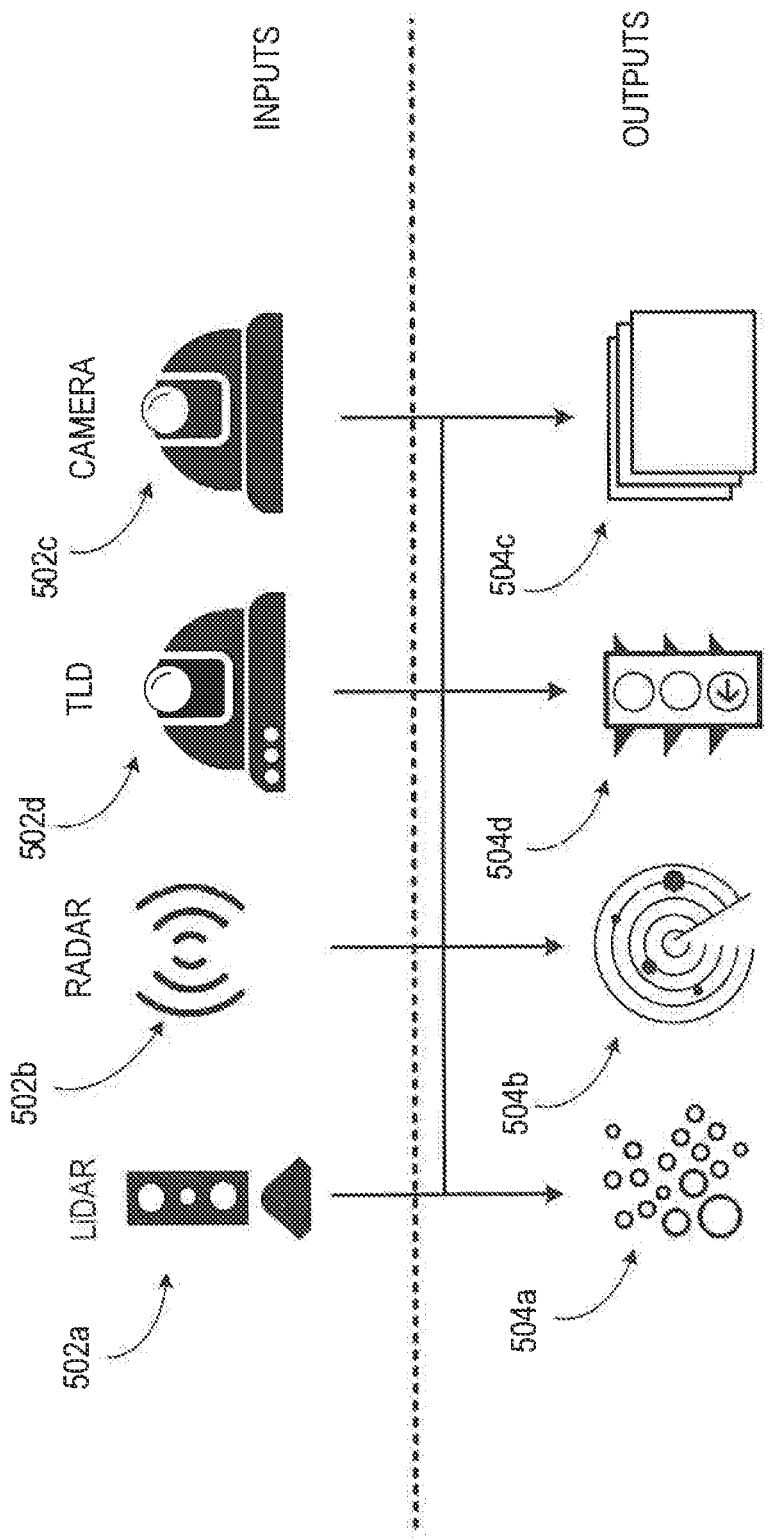
FIG. 5 illustrates an example of inputs and outputs that may be used by a perception module, in accordance with one or more embodiments.

FIG. 5 illustrates an example of inputs 502a-d (e.g., sensors 121 illustrated in FIG. 1) and outputs 504a-d (e.g., sensor data) that is used by the perception module 402 (FIG. 4). One input 502a is a LiDAR (Light Detection and Ranging) system (e.g., LiDAR 123 illustrated in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system 502b produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the AV 100 has access to all relevant navigation information provided by these objects. For example, the viewing angle of the TLD system may be about 120 degrees or more.

In some embodiments, outputs 504a-d are combined using a sensor fusion technique. Thus, either the individual outputs 504a-d are provided to other systems of the AV 100 (e.g., provided to a planning module 404 as illustrated in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

FIG. 6 illustrates an example of a LiDAR system 602 (e.g., the input 502a illustrated in FIG. 5). The LiDAR system 602 emits light 604a-c from a light emitter 606 (e.g., a laser transmitter). Light emitted by a LiDAR system is typically not in the visible spectrum; for example, infrared light is often used. Some of the light 604b emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
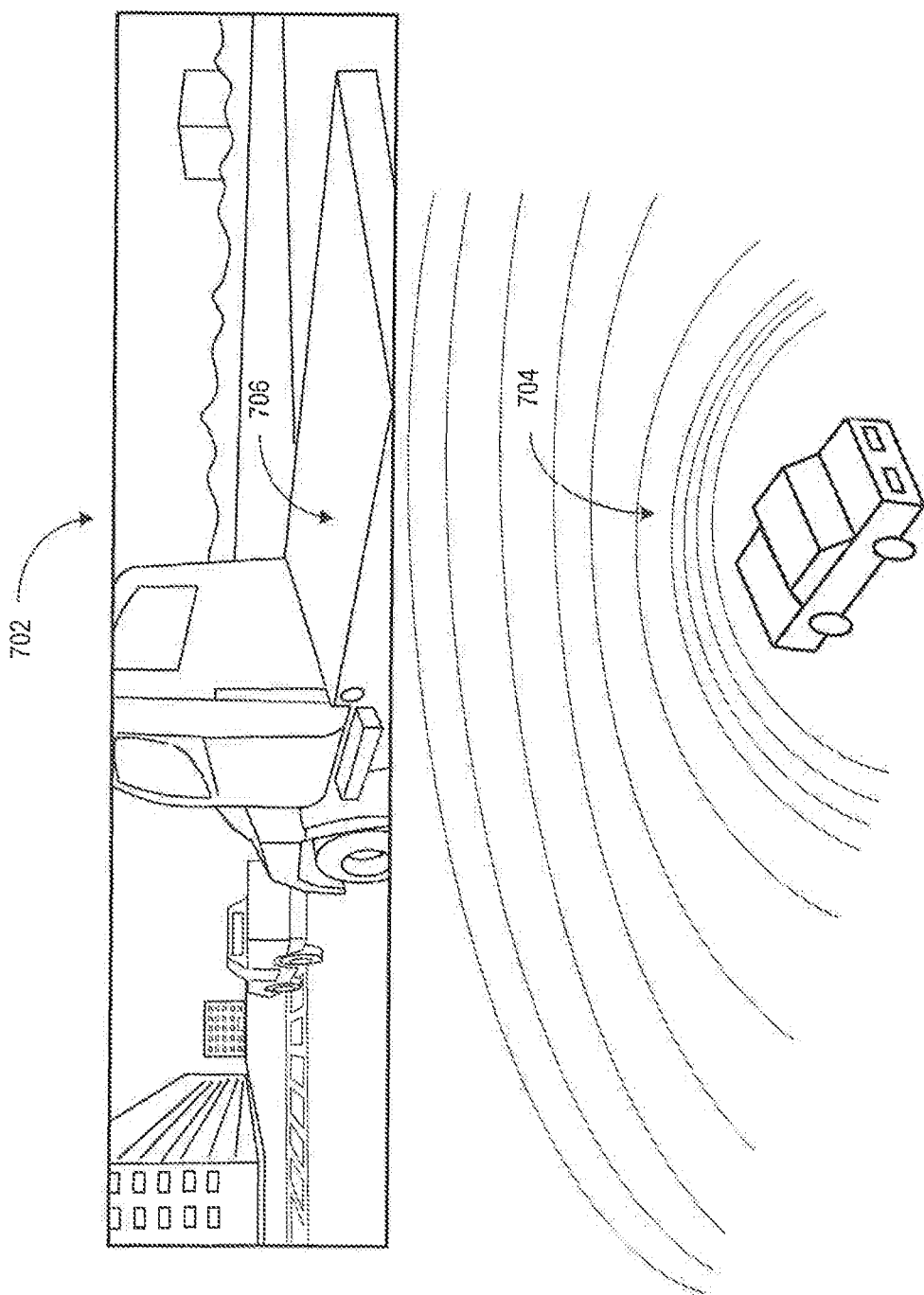
FIG. 7 illustrates the LiDAR system in operation, in accordance with one or more embodiments.

FIG. 7 illustrates the LiDAR system 602 in operation. In the scenario illustrated in this figure, the AV 100 receives both camera system output 504c in the form of an image 702 and LiDAR system output 504a in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
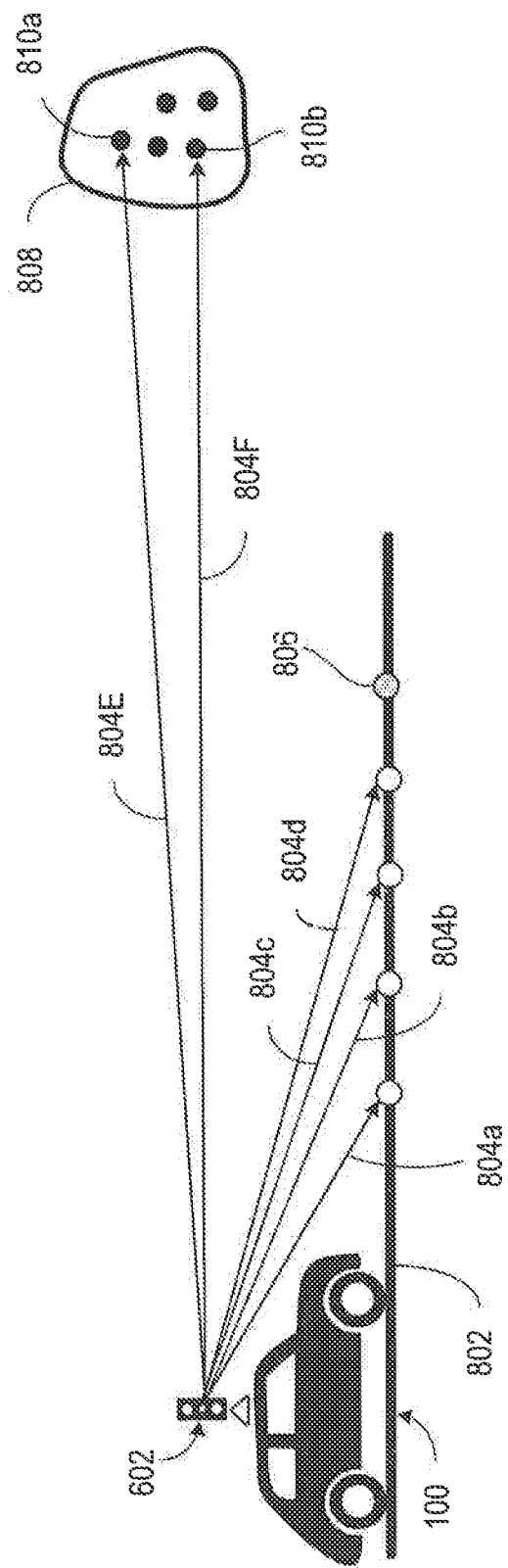
FIG. 8 illustrates the operation of the LiDAR system in additional detail, in accordance with one or more embodiments.

FIG. 8 illustrates the operation of the LiDAR system 602 in additional detail. As described above, the AV 100 detects the boundary of a physical object based on characteristics of the data points detected by the LiDAR system 602. As illustrated in FIG. 8, a flat object, such as the ground 802, will reflect light 804a-d emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804e-f emitted by the LiDAR system 602 will be reflected from points 810a-b in a manner inconsistent with the expected consistent manner. From this information, the AV 100 can determine that the object 808 is present.

Path Planning

Figure 9:
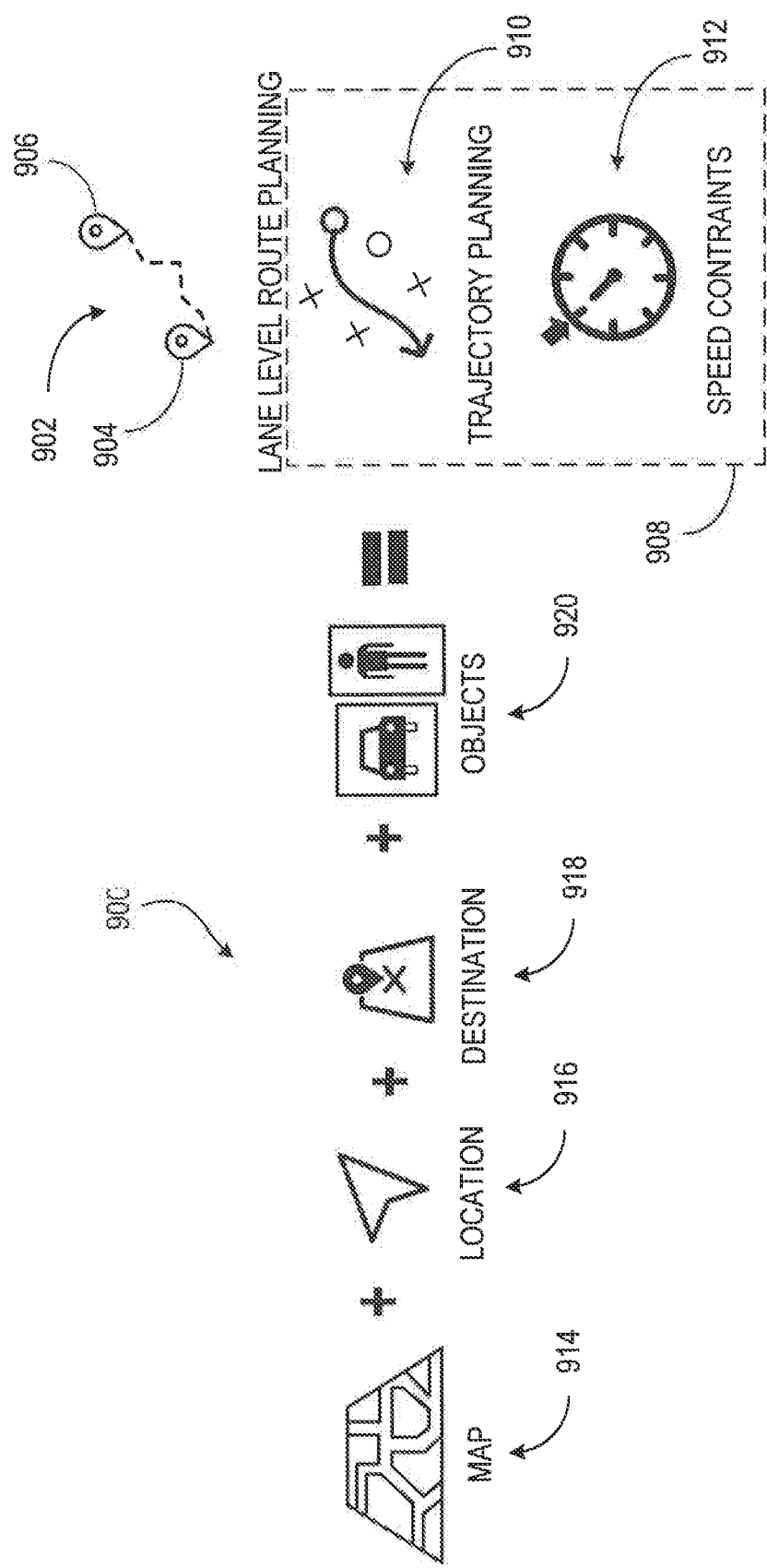
FIG. 9 illustrates a block diagram of the relationships between inputs and outputs of a planning module, in accordance with one or more embodiments.

FIG. 9 illustrates a block diagram 900 of the relationships between inputs and outputs of a planning module 404 (e.g., as illustrated in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the AV 100 to a travel speed slower than an expected speed, e.g., a speed based on speed limit data for the segment.

In an embodiment, the inputs to the planning module 404 includes database data 914 (e.g., from the database module 410 illustrated in FIG. 4), current location data 916 (e.g., the AV position 418 illustrated in FIG. 4), destination data 918 (e.g., for the destination 412 illustrated in FIG. 4), and object data 920 (e.g., the classified objects 416 as perceived by the perception module 402 as illustrated in FIG. 4). In some embodiments, the database data 914 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
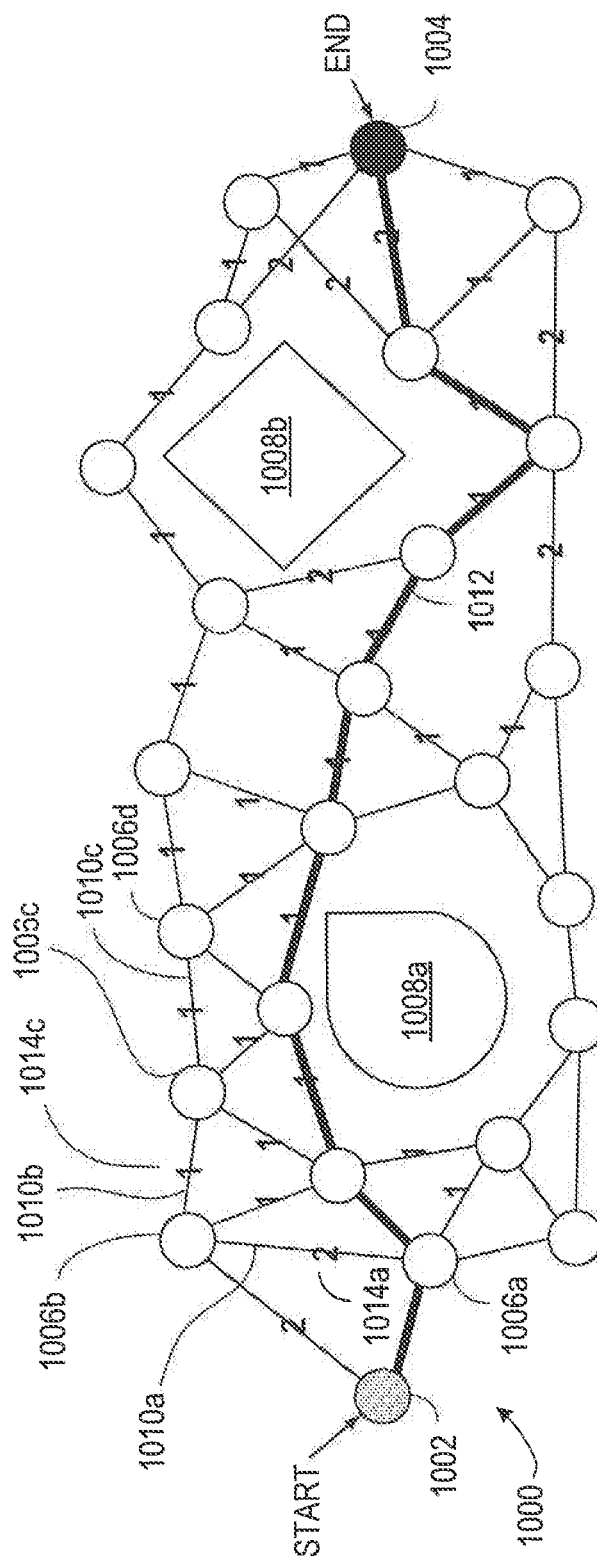
FIG. 10 illustrates a directed graph used in path planning, in accordance with one or more embodiments.

FIG. 10 illustrates a directed graph 1000 used in path planning, e.g., by the planning module 404 (FIG. 4). In general, a directed graph 1000 like the one illustrated in FIG.

10 is used to determine a path between any start point 1002 and end point 1004. In real-world terms, the distance separating the start point 1002 and end point 1004 may be relatively large (e.g., in two different metropolitan areas) or may be relatively small (e.g., two intersections abutting a city block or two lanes of a multi-lane road).

In an embodiment, the directed graph 1000 has nodes 1006a-d representing different locations between the start point 1002 and the end point 1004 that could be occupied by an AV 100. In some examples, e.g., when the start point 1002 and end point 1004 represent different metropolitan areas, the nodes 1006a-d represent segments of roads. In some examples, e.g., when the start point 1002 and the end point 1004 represent different locations on the same road, the nodes 1006a-d represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

The nodes 1006a-d are distinct from objects 1008a-b which cannot overlap with a node. In an embodiment, when granularity is low, the objects 1008a-b represent regions that cannot be traversed by automobile, e.g., areas that have no streets or roads. When granularity is high, the objects 1008a-b represent physical objects in the field of view of the AV 100, e.g., other automobiles, pedestrians, or other entities with which the AV 100 cannot share physical space. In an embodiment, some or all of the objects 1008a-b are static objects (e.g., an object that does not change position such as a street lamp or utility pole) or dynamic objects (e.g., an object that is capable of changing position such as a pedestrian or other car).

The nodes 1006a-d are connected by edges 1010a-c. If two nodes 1006a-b are connected by an edge 1010a, it is possible for an AV 100 to travel between one node 1006a and the other node 1006b, e.g., without having to travel to an intermediate node before arriving at the other node 1006b. (When we refer to an AV 100 traveling between nodes, we mean that the AV 100 travels between the two physical positions represented by the respective nodes.) The edges 1010a-c are often bidirectional, in the sense that an AV 100 travels from a first node to a second node, or from the second node to the first node. In an embodiment, edges 1010a-c are unidirectional, in the sense that an AV 100 can travel from a first node to a second node, however the AV 100 cannot travel from the second node to the first node. Edges 1010a-c are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010a-c has an associated cost 1014a-b. The cost 1014a-b is a value that represents the resources that will be expended if the AV 100 chooses that edge. A typical resource is time. For example, if one edge 1010a represents a physical distance that is twice as another edge 1010b, then the associated cost 1014a of the first edge 1010a may be twice the associated cost 1014b of the second edge 1010b. Other factors that affect time include expected traffic, number of intersections, speed limit, etc. Another typical resource is fuel economy. Two edges 1010a-b may represent the same physical distance, but one edge 1010a may require more fuel than another edge 1010b, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

Autonomous Vehicle Control

Figure 11:
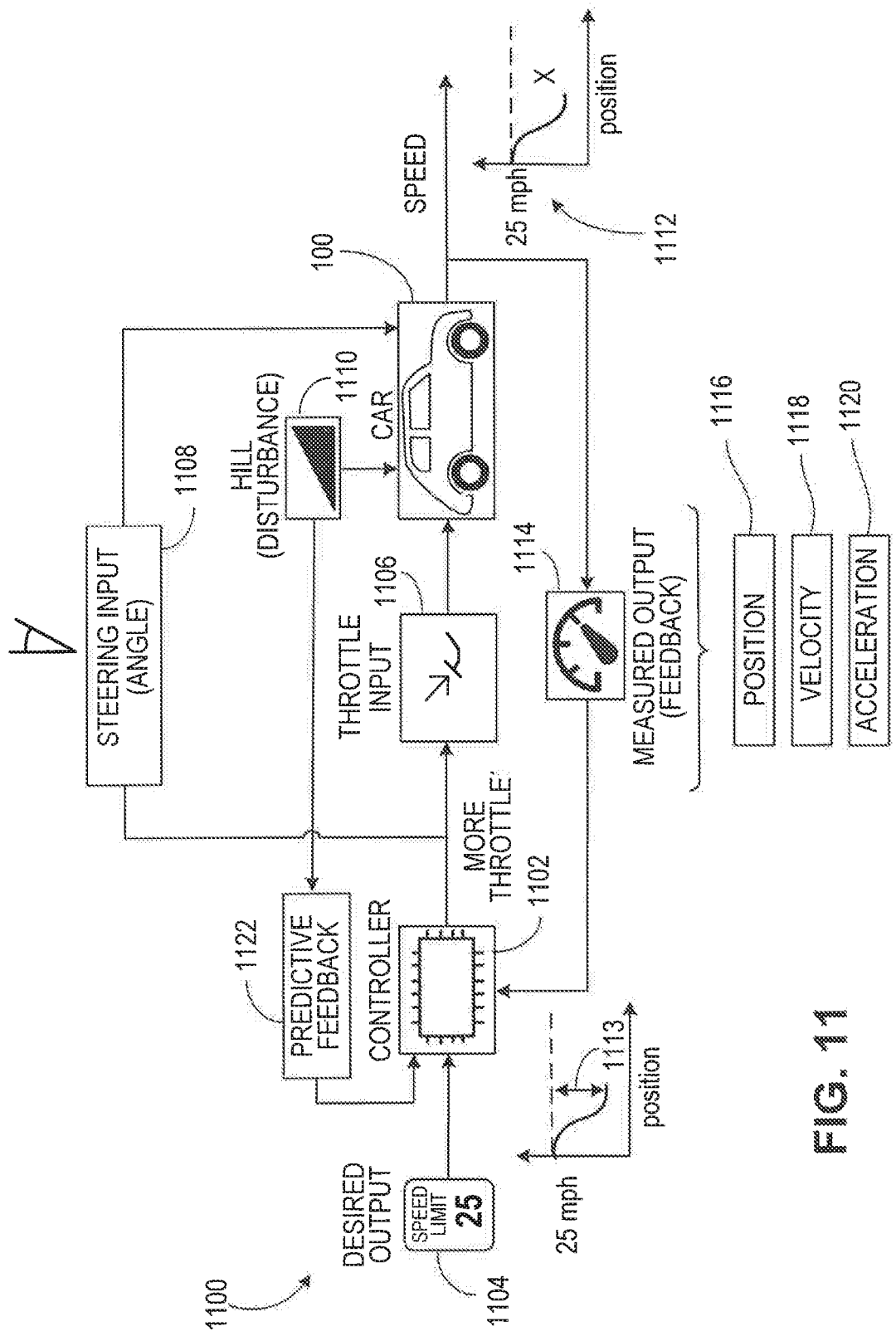
FIG. 11 illustrates a block diagram of the inputs and outputs of a control module, in accordance with one or more embodiments.

FIG. 11 illustrates a block diagram 1100 of the inputs and outputs of a control module 406 (e.g., as illustrated in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 1308, and storage device 210, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as illustrated in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an AV 100, e.g., by engaging the steering pedal, or engaging another throttle control, to achieve the desired output 1104. In some examples, the throttle input 1106 also includes data usable to engage the brake (e.g., deceleration control) of the AV 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the AV 100 encounters a disturbance 1110, such as a hill, the measured speed 1112 of the AV 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the AV 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the AV 100 detect ("see") a hill, this information can be used by the controller 1102 to prepare to engage the throttle at the appropriate time to avoid significant deceleration.

Figure 12:
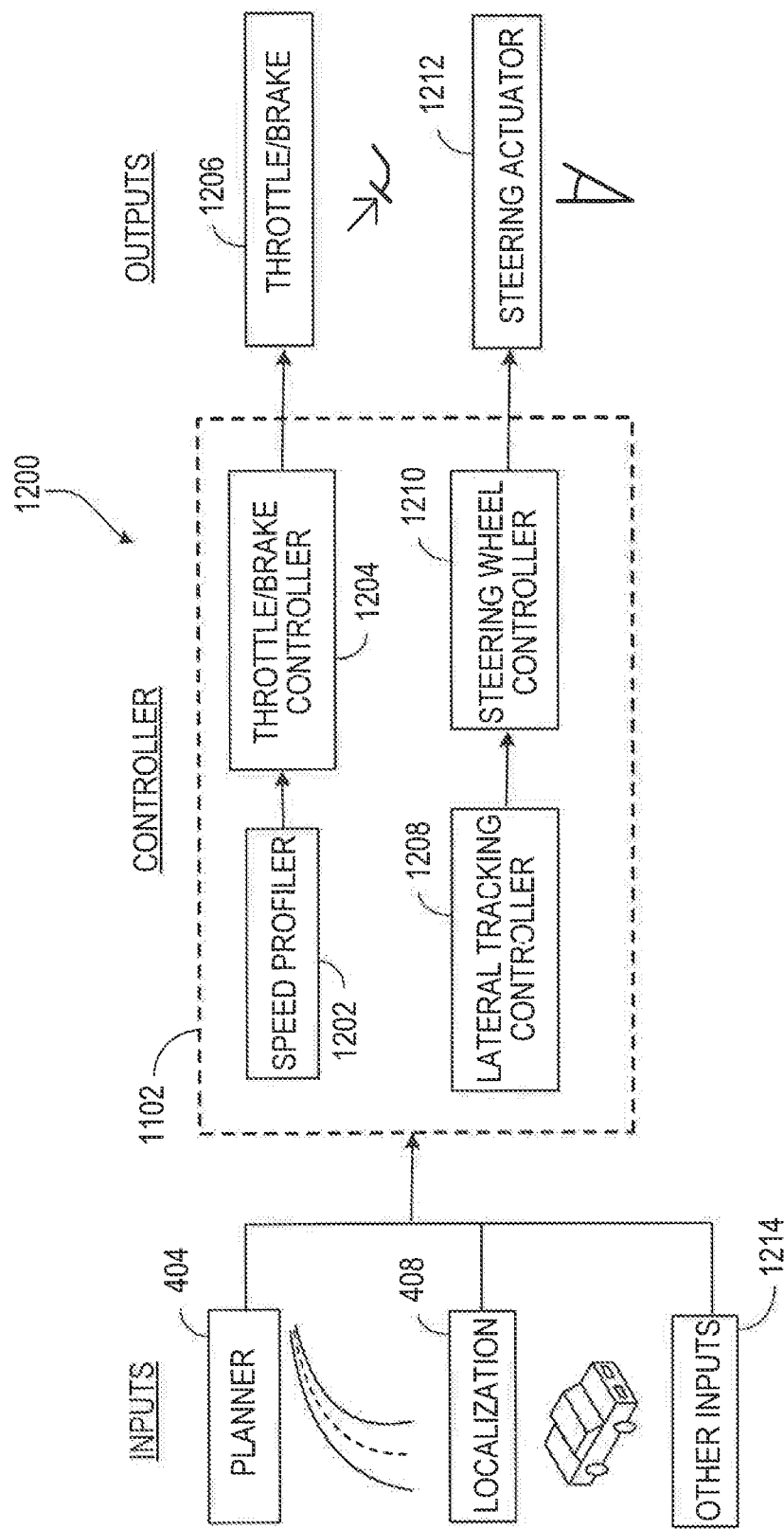
FIG. 12 illustrates a block diagram of the inputs, outputs, and components of a controller, in accordance with one or more embodiments.

FIG. 12 illustrates a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1204 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the AV 100 begins operation and to determine which road segment to traverse when the AV 100 reaches an intersection. A localization module 408 provides information to the controller 1102 describing the current location of the AV 100, for example, so that the controller 1102 can determine if the AV 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Architecture for Automatic Annotation of a Map

Figure 13:
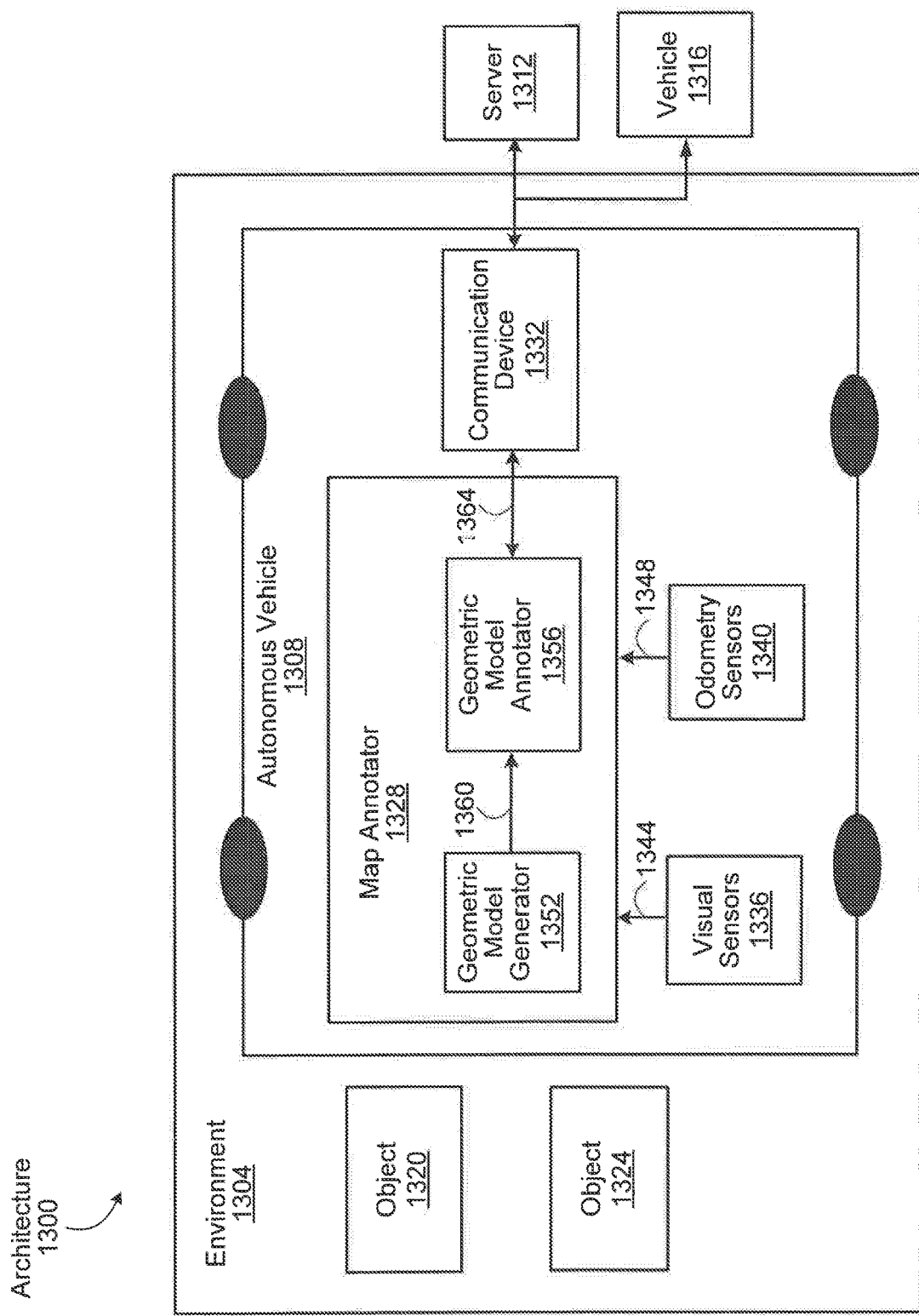
FIG. 13 illustrates a block diagram of an architecture for automatic annotation of environmental features in a map during navigation of a vehicle, in accordance with one or more embodiments.

FIG. 13 illustrates a block diagram of an architecture 1300 for automatic annotation of environmental features in a map 1364 during navigation of an AV 1308, in accordance with one or more embodiments. The architecture 1300 includes an environment 1304 within which the AV 1308 is located. The architecture 1300 also includes a remote server 1312 and one or more other vehicles 1316. The one or more other vehicles 1316 are other AVs, semi-autonomous vehicles, or non-autonomous vehicles navigating or parked outside or within the environment 1304. For example, the one or more other vehicles 1316 enter and exit the environment 1304 during navigation as well as navigate within other environments. The one or more other vehicles 1316 may be part of the traffic experienced on roadways of the environment 1304 by the AV 1308. In some embodiments, the one or more other vehicles 1316 belong to one or more AV fleets. In other embodiments, the architecture 1300 includes additional or fewer components than those described herein. Similarly, the functions can be distributed among the components and/or different entities in a different manner than is described here.

The environment 1304 may be an example of the environment 190 illustrated and described above with reference to FIG. 1. The environment 1304 represents a geographical area, such as a state, a town, a neighborhood, or a road network or segment. The environment 1304 includes the AV 1308, and one or more objects 1320, 1324. The objects are physical entities external to the AV 1308. In other embodiments, the environment 1304 includes additional or fewer components than those described herein. Similarly, the functions can be distributed among the components and/or different entities in a different manner than is described here.

The server 1312 stores data accessed by the AV 1308 and the vehicle 1316, and performs computations used by the AV 1308 and the vehicle 1316. The server 1312 may be an example of the server 136 illustrated in FIG. 1. The server 1312 is communicatively coupled to the AV 1308 and the vehicle 1316. In one embodiment, the server 1308 may be a "cloud" server as described in more detail above with respect to server 136 in FIGS. 1 and 2. Portions of the server 1308 may be implemented in software or hardware. For example, the server 1308 or a portion of the server 1308 may be part of a PC, a tablet PC, an STB, a smartphone, an internet of things (IoT) appliance, or any machine capable of executing instructions that specify actions to be taken by that machine. In one embodiment, the server 1312 stores live a map 1364 of the environment 1304 generated by the AV 1308, or other aerial or computer means, and transmits the map 1364 to the AV 1308 for updating or annotating. The server 1312 may also transmit portions of the map 1364 to the AV 1308 or vehicle 1316 to assist the AV 1308 or the vehicle 1316 in navigating the environment 1304.

The vehicle 1316 is a non-autonomous, partly autonomous, or autonomous vehicle located within or outside the environment 1304. In the embodiment of FIG. 13, the vehicle 1316 is illustrated located outside the environment 1304, however, the vehicle 1316 may enter or exit the environment 1304. There are two modes of operation: mapping mode and driving mode. In mapping mode, the AV 1308 travels the environment 1304 to generate the map 1364. In driving mode, the AV 1308, or the vehicle 1316 may receive a portion of the live map 1364 from the server 1312 for navigation assistance. In driving mode, the AV 1308 uses its sensors 1336 and 1340 to determine features of the environment 1304 and annotate or update the portion of the map 1364. In this manner, changing or dynamic characteristics of the environment 1304, such as temporary construction zones or traffic gridlock, are continuously updated on the live map 1364. In embodiments, the vehicle 1316 may generate or transmit portions of the map 1364 to the server 1312, and optionally, to the AV 1308.

The objects 1320, 1324 are located within the environment 1304 external to the AV 1308, as described above with reference to objects 416 in FIGS. 4 and 5. In one embodiment, the object 1320 is a static portion or aspect of the environment 1304, such as a road segment, a traffic signal a building, a parking space located on a road segment, a highway exit or entrance ramp, a plurality of lanes of a drivable area of the environment 1304 orientated in the same direction, an elevation of the drivable area, a curb located adjacent to the drivable area, or a median separating two lanes of the drivable area. The drivable area includes a road segment of the environment 1304, a parking space located on the road segment, a parking lot connected to the road segment, or a vacant lot located within the environment 1304. In an embodiment, the drivable area includes off-road trails and other unmarked or undifferentiated pathways that are traversable by the AV 1308. Static objects have more permanent characteristics of the environment 1304 that do not change every day. In driving mode, once features representing static characteristics are mapped, the AV 1308 can focus on navigating and mapping features representing more dynamic characteristics, such as another vehicle 1316.

In one embodiment, the object 1320 represents a road sign or traffic sign for navigation of a vehicle, such as a marking on a road segment, a road sign located within the environment, a traffic signal, or a median separating two lanes (that would instruct a driver with respect to driving direction and lane changes). In driving mode, the AV 1308 can use the semantic information from such mapped features from the map 1364 to derive context and make navigational decisions. For example, the semantic information embedded within a feature representing a median separating two lanes would instruct the AV 1308 not to stray too close to the median next to incoming traffic.

In another embodiment, the objects 1320, 1324 have characteristics of the environment associated with a vehicular maneuver, such as a splitting of a lane into a plurality of lanes, a merging of a plurality of lanes into a single lane, an intersection of a plurality of lanes, a roundabout including a spatial location for a vehicle to enter or exit the roundabout, or a curving of a lane of a road network. In driving mode, the mapped features representing such characteristics invoke navigational algorithms within the AV 1308's navigation system to direct the AV 1308 to make maneuvers such as three-point turns, lane merges, U-turn, Y turn, K turn, or entering a roundabout. In another embodiment, the object 1324 is a more-dynamic characteristics, such as another vehicle 1316, a pedestrian, or a cyclist. The mapped features representing the dynamic characteristics instruct the AV 1308 to perform collision prediction and reduce driving aggressiveness if needed. In mapping mode, the objects 1320, 1324 are classified by the AV 1308 (e.g., grouped into types such as pedestrian, automobile, etc.,) and data representing the classified objects 1320, 1324 is used for map generation. The objects 1320, 1324 are described above in more detail with reference to the physical object 608, boundaries 616 of a physical object 608, the physical object 706, the ground 802, and the object 808 in FIGS. 6, 7, and 8.

The AV 1308 includes the map annotator 1328, one or more sensors 1344 and 1348, and a communication device 1332. The AV 1308 is communicatively coupled to the server 1312 and, optionally, to the one or more vehicles 1316. The AV 1308 may be an example of the AV 100 in FIG. 1. In other embodiments, the AV 1308 includes additional or fewer components than those described herein. Similarly, the functions can be distributed among the components and/or different entities in a different manner than is described here.

The one or more visual sensors 1336 sense a state of the environment 1304, such as the presence and structure of the objects 1320, 1324, and transmit the sensor data 1344 and semantic data representing the state to the map annotator 1328. The visual sensors 1336 may be an example of the sensors 122-123 illustrated and described above with reference to FIG. 1. The visual sensors 1336 are communicatively coupled to the map annotator 1328 to transmit the sensor data 1344 and semantic data. The visual sensors 1336 include one or more monocular or stereo video cameras in the visible light, infrared or thermal (or both) spectra, LiDAR, radar, ultrasonic sensors, time-of-flight (TOF) depth sensors, and may include temperature sensors, humidity sensors, or precipitation sensors.

In one embodiment, the visual sensors 1336 generate the sensor data 1344, where the sensor data 1344 includes a plurality of features of the environment. A feature is a part of the sensor data 1344 that represents one or more characteristics of the object 1320 or 1324. For example, a feature may model a portion of the surface or portion of the structure of the object 1324. The map annotator 1328 receives the sensor data 1344 and semantic data and generates derived values (features) from the sensor data 1344. The features are intended to be an informative and non-redundant representation of the physical or semantic characteristics of the object 1320. The annotating of the map 1364 is performed by using this reduced representation (features) instead of the complete initial sensor data 1344. For example, the LiDAR sensors of the AV 1308 are used to illuminate the target object 1320 with pulsed laser light and measure the reflected pulses 1344. Differences in laser return times and wavelengths can then be used to make a digital 3-D representation (feature) of the target object 1320.

In one embodiment, the visual sensors 1336 are spatially distributed smart camera or LiDAR devices capable of processing and fusing the sensor data 1344 of the environment 1304 from a variety of viewpoints into a more useful form of data than individual images. For example, the sensor data 1344 includes LiDAR point cloud data reflected from a target object 1320. In another example, the sensor data includes an image of the plurality of features of the environment 1340. The sensor data 1344 is transmitted to the map annotator 1328 for image processing, communication, and storage functions. The visual sensors 1336 are described above in more detail with reference to inputs 502a-d, LiDAR system 602, light 604a-c, light emitter 606, light detectors 610, field of view 614, and light 804a-d in FIGS. 6, 7, and 8. The sensor data 1344 is described above in more detail with reference to outputs 504a-d, image 612, and LiDAR data points 704 in FIGS. 6, 7, and 8.

In one embodiment, the AV 1308 is located at a spatiotemporal location within the environment 1304 and the plurality of features is associated with the spatiotemporal location. The spatiotemporal location includes geographical coordinates, a time associated with the AV 1308 located at the geographical coordinates, or a heading (directional orientation or pose) of the AV 1308 located at the geographical coordinates. In one embodiment, the first spatiotemporal location includes GNSS coordinates, a name of a business, a street address, or a name of a city or town.

The sensors 1336 and 1340 receive the sensor data 1344 and 1348 as well as semantic data associated with the environment 1304. In one embodiment, the semantic data represents a marking on the drivable area, a road sign located within the environment 1304, or a traffic signal located within the environment 1304. For example, images taken by cameras within the sensors 1336 can be used for image processing to extract the semantic data. The semantic data is used by the AV 1308 to impart meaning to the features, such that the features can be used for intelligent navigational decision making. For example, a marking on the drivable area that directs traffic in a particular direction prompts the AV 1308 to travel in that direction. A road sign located within the environment 1304 that has a "yield" marking or instruction directs the AV 1308 to yield to oncoming traffic or merging traffic. A traffic signal located within the environment 1304 directs the AV 1308 to stop when the light is red and go when the light is green.

The one or more odometry sensors 1340 sense a state of the AV 1308 with respect to the environment 1304 and transmit odometry data 1348 representing the state of the AV 1308 to the map annotator 1328. The odometry sensors 1340 may be an example of the sensors 121 illustrated and described above with reference to FIG. 1. The odometry sensors 1340 are communicatively coupled to the map annotator 1328 to transmit the odometry data 1348. The odometry sensors 1340 include one or more GNSS sensors, IMUs that measure both vehicle linear accelerations and angular rates, wheel speed sensors for measuring or estimating wheel slip ratios, wheel brake pressure or braking torque sensors, engine torque or wheel torque sensors, or steering angle and angular rate sensors. An IMU is an electronic device that measures and reports the AV's specific force, angular rate, or the magnetic field surrounding the AV. The IMU uses a combination of accelerometers, gyroscopes, or magnetometers. The IMU is used to maneuver the AV. The IMU allows a GNSS receiver on the AV to work when GNSS-signals are unavailable, such as in tunnels, or when electronic interference is present. The odometry measurements include a speed, an acceleration, or a steering angle. The AV uses the odometry data to provide a uniquely identifying signature for distinguishing between different spatiotemporal locations within the environment.

In one embodiment, the odometry sensors 1340 measure and report the AV 1308's spatiotemporal location, specific force, angular rate, or a magnetic field surrounding the AV 1308, using a combination of accelerometers, gyroscopes, or magnetometers. In another embodiment, the odometry sensors 1340 generate odometry data 1348 including a speed, a steering angle, a longitudinal acceleration, or a lateral acceleration. The odometry sensors 1340 utilize the raw IMU measurements to determine attitude, angular rates, linear velocity, and position relative to a global reference frame. In one embodiment, the odometry data 1348 reported by the IMU is used to determine attitude, velocity, and position by integrating angular rate from a gyroscope to calculate angular position.

The map annotator 1328 receives a map 1364 of the environment 1304 from the server 1312, generates a geometric model 1360 of a feature of the environment 1304, and embeds an annotated version of the geometric model within the map 1364. The map annotator 1328 includes a geometric model generator 1352 and a geometric model annotator 1356. The map annotator 1328 is communicatively coupled to the visual sensors 1336 and the odometry sensors 1340 to receive the sensor data 1344, semantic data, and the odometry data 1348. The map annotator 1328 is communicatively coupled to a communication device 1332 to transmit the annotated map 1364 to the communication device 1332.

The map annotator 1328 may be an example of the planning module 404 illustrated in FIG. 4 or may be contained within the planning module 404. The map annotator 1328 may be implemented in software or hardware. For example, the map annotator 1328 or a portion of the map annotator 1328 may be part of a PC, a tablet PC, an STB, a smartphone, an IoT appliance, or any machine capable of executing instructions that specify actions to be taken by that machine. In other embodiments, the map annotator 1328 includes additional or fewer components than those described herein. Similarly, the functions can be distributed among the components and/or different entities in a different manner than is described here.

The geometric model generator 1352 generates, from the sensor data 1344, a geometric model 1360 of a feature of the plurality of features. The geometric model generator 1352 may be implemented in software or hardware. For example, the geometric model generator 1352 or a portion of the geometric model generator 1352 may be part of a PC, a tablet PC, an STB, a smartphone, an IoT appliance, or any machine capable of executing instructions that specify actions to be taken by that machine.

The geometric model generator 1352 extracts the feature from the sensor data 1344. To extract the feature, in one embodiment, the geometric model generator 1352 generates a plurality of pixels from the sensor data 1344. The number N of pixels generated corresponds to a number of LiDAR beams of the visual sensors 1336, for example, the number of LiDAR beams 604a-c from the light emitter 606 of the LiDAR system 602 in FIG. 6. The geometric model generator 1352 analyzes a depth difference between a first pixel of the plurality of pixels and neighboring pixels of the first pixel to extract the feature. In one embodiment, the geometric model generator 1352 renders each pixel of the plurality of pixels according to a range of heights collected for the pixel. The geometric model generator 1352 determines a visible height of the target object 1320. The geometric model generator 1352 generates a digital model of the target object 1320 from the sensor data 1344 and uses sequential filters to segment the digital model into the feature. When generating the plurality of pixels from the sensor data 1344, the geometric model generator 1352 considers the positional uncertainty and the directional orientation of the AV 1308.

The geometric model generator 1352 associates the feature with a drivable area within the environment 1304. In one embodiment, existing information from the live map 1364 and the sensor data 1344 are combined to associate the feature with the drivable area. The geometric model generator 1352 detects the drivable area based on information from the live map learned from other areas of the environment 1304. From the sensor data 1344, the geometric model generator 1352 detects the drivable area by learning a present appearance of the road from a training area. For example, a Bayes framework may be used to combine the live map information and the sensor data 1344 to associate the feature with the drivable area.

The geometric model generator 1352 extracts a drivable segment from the drivable area. The drivable segment is correlated to the extracted feature based on the spatiotemporal location of the AV 1308. In one embodiment, the geometric model generator 1352 uses cues such as color and lane markings to extract the drivable segment. The geometric model generator 1352 further uses the LiDAR points' spatial information to analyze the drivable area and correlate segments of the drivable area to the feature. In one embodiment, the geometric model generator 1352 fuses image data and LiDAR points of the feature to perform the correlating. The benefits and advantages of the fusion approach are that it obviates the need for training steps or manually labelled data. In this embodiment, the geometric model generator 1352 uses superpixels as basic processing units to combine sparse LiDAR points with image data. A superpixel is a polygonal part of a digital image and is larger than a normal pixel. Each superpixel is rendered using a uniform color and brightness. The superpixels are dense and include color information that the LiDAR sensors are unable to capture, while the LiDAR points include depth information that the cameras cannot obtain. The geometric model generator 1352 performs superpixel classification to segment the drivable area within the environment 1304 and extract the drivable segment.

In one embodiment, the geometric model generator 1352 uses the odometry data 1348 described above to determine the spatiotemporal location of the AV 1308 relative to a boundary of the drivable area. The location coordinates include latitude, longitude, altitude, or coordinates with reference to an external object, for example, object 1320 or vehicle 1316. In one embodiment, the geometric model generator 1352 uses the odometry data 1348 to estimate a change in the AV 1308's position over time relative to an initial spatiotemporal location by analyzing the associated sensor data 1344. The geometric model generator 1352 extracts image feature points from the sensor data 1344 and tracks the image feature points in an image sequence to determine location coordinates of the AV 1308. The geometric model generator 1352 defines the feature of interest and performs probabilistic matching of the feature across image frames to construct an optical flow field for the AV 1308. The geometric model generator 1352 examines the flow field vectors for potential tracking errors and removes any outliers that are identified. The geometric model generator 1352 estimates motion of the visual sensors 1336 from the constructed optical flow. The estimated motion is then used to determine a spatiotemporal location and directional orientation of the AV 1308. In this manner, a drivable segment containing the AV 1308's spatiotemporal location is extracted from the drivable area.

The geometric model generator 1352 segregates the extracted drivable segment into a plurality of geometric blocks. Each geometric block corresponds to a characteristic of the drivable area. A characteristic of the drivable area refers to a positioning of the physical elements of a roadway, defined by alignment, profile, and cross-section of the drivable area. Alignment is defined as a series of horizontal tangents and curves of the drivable area. Profile is a vertical aspect of the road, including crest and sag curves. Cross section illustrates positions and a number of vehicle and bicycle lanes and sidewalks, along with their banking. Cross sections also illustrate drainage features or pavement structure of the drivable area.

In one embodiment, the generating of the geometric model 1360 includes classifying the sensor data 1344, for example, the LiDAR point cloud data. For example, height-based segmentation may be used to interpolate surface models from the LiDAR point cloud data 1344. In one embodiment, shape fitting is used to triangulate a surface from the LiDAR point cloud data 1344 and then segment out each geometric block using a morphological interpretation of the shape of the interpolated surface. In another embodiment, spectral segmentation is used to segregate the extracted drivable segment into the plurality of geometric blocks based on the intensity values or RGB values of the LiDAR point cloud data 1344. The geometric model 1360 of the feature includes the plurality of segregated geometric blocks.

Disclosed herein are embodiments relating to the generating of geometric models for different environmental objects and features. The geometric model 1360 of a lane includes one baseline path. This geometric model is the smallest geometric entity that other features are based off. In one embodiment, the geometric model represents a plurality of lanes of the drivable area orientated in the same direction. Each geometric block of the plurality of geometric blocks represents a single lane of the drivable area. The geometric model is a block of lanes within a non-intersection road segment. The block of lanes has the same traffic direction within its area, such that, each lane has the same source edge and destination edge on a graph of the road network, for example, in FIG. 10 illustrated above. Within the block of lanes, a number of the lanes does not vary. The plurality of lanes share lane dividers within the drivable area and the block of lanes is expressed as a union of lane blocks, such as: (lane 1) U (lane 2) U . . . U (lane N). In one embodiment, a feature represents a carpark or a parking lot associated with a block of lanes.

A lane connector feature represents a connection from one edge of a source lane to another edge of a destination lane (see FIG. 10). The area of a lane connector is based on the widths of the source edge and destination edge along a curvature of a baseline path that the lane connector contains. In one embodiment, a geometric model represents a block of lane connectors within an intersection. Each block of lane connectors has the same traffic direction, that is, each lane connector has the same source edge and destination edge in the directed graph of FIG. 10 above. The number of lane connectors does not change within an intersection.

In one embodiment, a feature represents a Dubins path. A Dubins path is the shortest curve that connects two points in a two-dimensional Euclidean plane (X-Y plane). A Dubins path has a constraint on the curvature of the path and the prescribed initial and terminal tangents to the path.

In one embodiment, a feature represents an elevation of the drivable area, a curb located adjacent to the drivable area, or a median separating two lanes of the drivable area. For example, the feature may represent a super-elevation, such as an amount by which an outer edge of a curve on a road is banked above an inner edge. The presence of a curb may be represented by a cross section of a roadway. The cross section includes a number of lanes, their widths, and cross slopes, as well as the presence or absence of shoulders, curbs, sidewalks, drains, ditches, and other roadway features. A median or road divider feature separates a block of lanes from another block of lanes, for example, the median or road divider separates two blocks of lanes having different traffic directions. A lane divider feature separates two lanes having the same traffic direction.

In one embodiment, a feature represents a walkway or sidewalk on a road segment. For example, a pedestrian crossing feature is represented by a geometric model that is superimposed on a road segment. A geometric model of a pedestrian watch zone represents an area where the AV 1308 is likely to encounter pedestrians even though the pedestrian watch zone is not a pedestrian crossing or walkway. The pedestrian watch zone is extracted from the sensor data 1344 based on historical observations.

In one embodiment, the generating of the geometric model 1360 includes superimposing a plurality of geometric blocks onto the LiDAR point cloud data 1344 to generate a polygon including a union of the geometric blocks. For example, the LiDAR point cloud data 1344 is used as a base map onto which the geometric blocks are superimposed. The geometric blocks range in their location, size, and shape. The individual attributes of the geometric blocks are edited onto the LiDAR point cloud data 1344 to derive a polygon and visualize a spatial distribution of a union of the geometric blocks. For example, the drivable area includes a road segment, a parking space located on the road segment, a parking lot connected to the road segment, or a vacant lot located within the environment. A geometric model representing a portion of the drivable area, therefore, is a polygon including one or more road segments. The drivable area is expressed as a union of road segments, for example, (road segments (non-intersections)) U (road segments (intersections)). The polygonal representation is therefore a union of all the road segment polygons. In one embodiment, the drivable area includes features that represent avoidance zones. An avoidance zone is an area containing another stopped vehicle.

In one embodiment, a polygon represents an "inout edge." An inout edge or bidirectional edge is an edge of the directed graph of FIG. 10 above that separates a non-intersection road segment and an intersection road segment. An inout edge includes one or more drive-through edges that are in one or more directions of traffic. If the inout edge has more than one traffic direction, the drive-through edges share nodes of the graph that are part of road dividers. An inout edge is expressed as a union, such as (drive-through edge 1) U (drive-through edge 2) U . . . U (drive-through edge N). The inout edge is therefore represented by a union of all the drive-through edges that it includes. Each inout edge is associated with a portion of the drivable area. A drive-through edge is an edge separating a block of lanes and a road block connector. A drive-through edge includes one or more lane edges. If a drive-through edge includes more than one lane edge, the included lane edges share nodes that are part of lane dividers. A drive-through edge is therefore expressed as a union, such as (lane edge 1) U (lane edge 2) U . . . U (lane edge N), that is, the drive-through edge is a union of the lane edge lines that it includes. A lane edge is an edge separating a lane and a lane connector.

In one embodiment, a polygon represents a precedence area. A precedence area is a portion of the drivable area that is determined to be of higher priority than the spatiotemporal location currently occupied by the AV 1308. Other vehicles, bicyclists, or pedestrians moving or stopped on the precedence area therefore have the right of way. A precedence area has a number of flags, such as car, bike, pedestrian, etc. If a precedence area is tagged with a particular flag, the vehicle or pedestrian has priority over the AV 1308.

In one embodiment, a polygon represents a stop line for the AV 1308. A stop line is coupled to a stop area that the AV 1308 is required to stop within. The AV 1308 would stop when encountering a stop line, such as a stop sign, a yield sign, a pedestrian crossing, a traffic light, or a right or left turn. A stop line is associated with a block of lanes (when the stop line is a stop sign, a yield sign, a pedestrian crossing, or a traffic light) or a road block connector (when the stop line is a right or left turn). Each stop line is additionally associated with a pedestrian crossing or a traffic light. Each pedestrian crossing stop line is associated with a pedestrian crossing. Each traffic light stop line is associated with a traffic light. Each right or left turn stop lines is associated with a pedestrian crossing.

In one embodiment, a polygon represents a splitting of a lane of the drivable area into a plurality of lanes, an intersection of a plurality of lanes, or a merging of a plurality of lanes into a single lane. A splitting or merging of lanes is associated with a sight area clear of obstructions in order for the AV 1308 to operate safely. At a merge, the basic right-of-way rules apply (either yield to the vehicle on the right, or the boulevard rule, depending on the location). The AV 1308 should be able to sense traffic approaching on the intersecting road at a point where the AV 1308 can adjust its speed or stop to yield to the other traffic.

In one embodiment, an intersection includes a change in a number of lanes along a road segment, a fork, a merging of lanes, or a junction of three or more roads. A polygon representing an intersection includes one or more road block connectors. The intersection is expressed as a union, such as (road block connector 1) U (road block connector 2) U . . . U (road block connector N). An intersection polygon may include a three-way intersection (such as a junction between three road segments), a T junction when two arms form one road, a Y junction or fork, or a four-way intersection or crossroad.

In one embodiment, a polygon represents a roundabout including a spatial location on the drivable area for the AV 1308 to enter or exit the roundabout. The roundabout feature includes a circular intersection or junction in which road traffic flows in one direction around a central island. The roundabout feature requires entering traffic to give way to traffic already in the circle and optimally observe various design rules to increase safety. A roundabout polygon may be associated with features indicating tram or train lines or a two-way traffic flow.

In one embodiment, a polygon represents a curving of a lane of the drivable area. For example, a polygon includes one or more geometric blocks that are oriented in a plurality of directions. The geometric blocks share road dividers. The curving road segment is therefore expressed as a union, such as (road block 1) U (road block 2) U . . . U (road block N). The polygonal representation is the union of all road blocks that the curve contains. A road curve affects the sight distance available to the AV 1308, that is a length of roadway ahead visible to the AV 1308 before the line of sight is blocked by a hill crest, or an obstacle on the inside of a horizontal curve or intersection.

The geometric model annotator 1356 generates an annotated map 1364 of the environment 1304. The geometric model annotator 1356 is communicatively coupled to the visual sensors 1336 to receive the sensor data 1344 and the semantic data. The geometric model annotator 1356 is communicatively coupled to the odometry sensors 1340 to receive the odometry data 1348. The geometric model annotator 1356 is communicatively coupled to the communication device 1332 to transmit the annotated map 1364. The geometric model annotator 1356 may be implemented in software or hardware. In one embodiment, the geometric model annotator 1356 or a portion of the geometric model annotator 1356 is part of a PC, a tablet PC, an STB, a smartphone, an IoT appliance, or any machine capable of executing instructions that specify actions to be taken by that machine.

The geometric model annotator 1356 performs semantic annotation to label pixels or portions of the geometric model 1360 using the semantic data. Semantic labeling is therefore different from the geometric segmentation discussed above, which extracts a feature of interest and generates a geometric model of the feature. Semantic annotation, on the other hand, provides an understanding of the pixels and portions of the feature or geometric model 1360. In one embodiment, the geometric model annotator 1356 annotates the geometric model 1360 by generating a computer-readable semantic annotation that combines the geometric model 1360 and the semantic data. To perform the annotation, the geometric model annotator 1356 associates each pixel of the geometric model 1360 with a class label (such as "yield sign," "no right turn," or "parked vehicle").

In one embodiment, the geometric model annotator 1356 extracts a logical driving constraint from the semantic data. The logical driving constraint is associated with navigating the AV 1308 along the drivable area. For example, the logical driving constraint includes a traffic light sequence, a conditional left or right turn, or a direction of traffic. Other examples of a logical driving constraint include reducing speed when the AV 1308 approaches a speed bump, moving to an exit lane when approaching an exit of a highway, or decelerating to facilitate an overtaking vehicle. The logical driving constraint may be annotated onto the geometric model 1360 in a computer-readable script that the planning module 404 or control module 406, illustrated and described above with reference to FIG. 4, can execute.

The geometric model annotator 1356 embeds the annotated geometric model 1360 within the map 1364. In one embodiment, the geometric model annotator 1356 embeds the annotated geometric model 1360 by embedding a computer-readable semantic annotation corresponding to the annotated geometric model 1360 within the map 1364. The geometric model annotator 1356 embeds the semantic annotation such that it becomes a source of information that is easy to interpret, combine and reuse by the AV 1308, the server 1312, or the vehicle 1316. For example, the semantic annotation may be a structured digital marginalia that is invisible in the human-readable part of the map 1364. Because the semantic annotation is machine-interpretable, the semantic annotation enables the AV 1308 to perform operations such as classifying, linking, inferencing, searching, or filtering the map 1364. The geometric model annotator 1356 thereby enriches the map content with computer-readable information by linking the map 1364 to the extracted environmental features.

In one embodiment, the map annotator 1328 receives, from a second vehicle 1316, a computer-readable semantic annotation. The map annotator 1328 merges the live map 1364 with the received computer-readable semantic annotation for transmittal to a remote server 1312. For example, the map annotator 1328 processes a bitmap image containing the received computer-readable semantic annotation. A region of interest in the bitmap image is extracted automatically based on color information and its geometric properties are determined. The result of this process is a structured description of a feature that serves as an input to the map 1364.

In one embodiment, the geometric model annotator 1356 embeds the annotated geometric model 1360 within the map 1364 in the mapping mode or driving mode of operation. In the driving mode, the AV 1308 receives the live map 1364 from the server 1312. The AV 1308 determines, from the annotated geometric model within the map 1364, the drivable area in for navigation as described and illustrated above with reference to FIG. 11. The geometric model annotator 1356 annotates the geometric model 1360 using the semantic data for newly sensed features. The control module 406 navigates the AV 1308 within the drivable area using the map 1364.

The map 1364 enables autonomous driving using semantic features such as the presence of a parking spot or a side road. In driving mode, the AV 1308 combines its own sensor data with the semantic annotations from the map 1364 to observe the road conditions in real-time. Thus, the AV 1308 can understand road conditions over 100 m in advance. The annotated map 1364 provides higher accuracy and reliability than on-board sensors alone. The map 1364 provides an estimate of the AV 1308's spatiotemporal location, and the AV 1308's navigation system is aware of the intended destination. The AV 1308 determines a local navigation goal within view of the AV 1308. The AV 1308's sensors generate a path to the local navigation goal using the map 1364 to determine a location of the road's edges. In the driving mode, the AV 1308 extracts the annotated geometric model 1360 from the live map 1364. The control module 406 navigates the AV 1308 by transmitting a command to a throttle or a brake 1206 of the AV 1308 responsive to the extracting of the annotated geometric model 1360, as illustrated and described in detail above with reference to FIG. 12.

In one embodiment, the AV 1308 stores a plurality of operational metrics associated with navigating the AV 1308 along the drivable area. The operational metrics are stored in the main memory 306, the ROM 308, or the storage device 310, as described and illustrated above with reference to FIG. 3. An operational metric associated with a travel segment may denote a number of predicted collisions of the AV 1308 with an object 1320 when traveling along the travel segment, a number of predicted stops for the AV 1308 when traveling along the travel segment, or a predicted lateral clearance between the AV 1308 and an object 1320 when traveling along the travel segment. The map annotator 1328 updates the plurality of operational metrics using the map 1364. The planning module 404 determines, using the updated plurality of operational metrics, rerouting information for the AV 1308. For example, the determining of the rerouting information includes selecting travel segments associated with a number of predicted collisions less than a threshold (e.g., 1), selecting travel segments associated with a number of predicted stops less than a threshold, or selecting travel segments associated with a predicted lateral clearance between the AV 1308 and the object 1320 greater than a threshold. The communicating device 1332 transmits the rerouting information to a server 1312 or another vehicle 1316 located within the environment 1304. The control module 406 of the AV 1308 navigates the AV 1308 on the drivable area using the determined rerouting information.

The map annotator 1328 transmits the map 1364 having the computer-readable semantic annotations via the communication device 1332. The communication device 1332 also communicates data such as instructions or measured or inferred properties of the AV 1308 or other vehicles' states and conditions with the server 1312, a passenger within the AV 1308, or other vehicles. The communication device 1332 may be an example of the communication device 140 illustrated in FIG. 1. The communication device 1332 is communicatively coupled to the server 1312 and optionally the vehicle 1316 across a network. In an embodiment, the communications device 1332 communicates across the Internet, electromagnetic spectrum (including radio and optical communications) or other media (e.g., air and acoustic media). Portions of the communication device 1332 may be implemented in software or hardware. For example, the communication device 1332 or a portion of the communication device 1320 may be part of a PC, a tablet PC, an STB, a smartphone, an IoT appliance, or any machine capable of executing instructions that specify actions to be taken by that machine. The communication device 1332 is described in more detail above with respect to communication device 140 in FIG. 1.

The benefits and advantages of the embodiments disclosed herein are that navigation of an AV using the annotated map is more accurate and computationally less expensive than traditional methods that directly scan a point cloud space. The AV is able to efficiently determine localization for real-time navigation. Navigating the AV using the live annotated map results in increased passenger and pedestrian safety, lower wear and tear on the AV, reduced travel time, a reduced travel distance, etc. Increased safety for other vehicles on the road network is also achieved.

Fusing image data and LiDAR points to correlate the feature to a drivable area obviates the need for training steps or manually labelled data. Moreover, annotating the geometric model with the semantic data reduces the errors that might result from sensor noise and the AV's estimation of its directional orientation and location. Further benefits and advantages of using the map annotator are that the AV is able to correctly distinguish between two or more plausible positions within the live map. An annotated feature is therefore embedded at the correct spatiotemporal location within the map.

Example Environment for Automatic Annotation of Environmental Features in a Map

Figure 14:
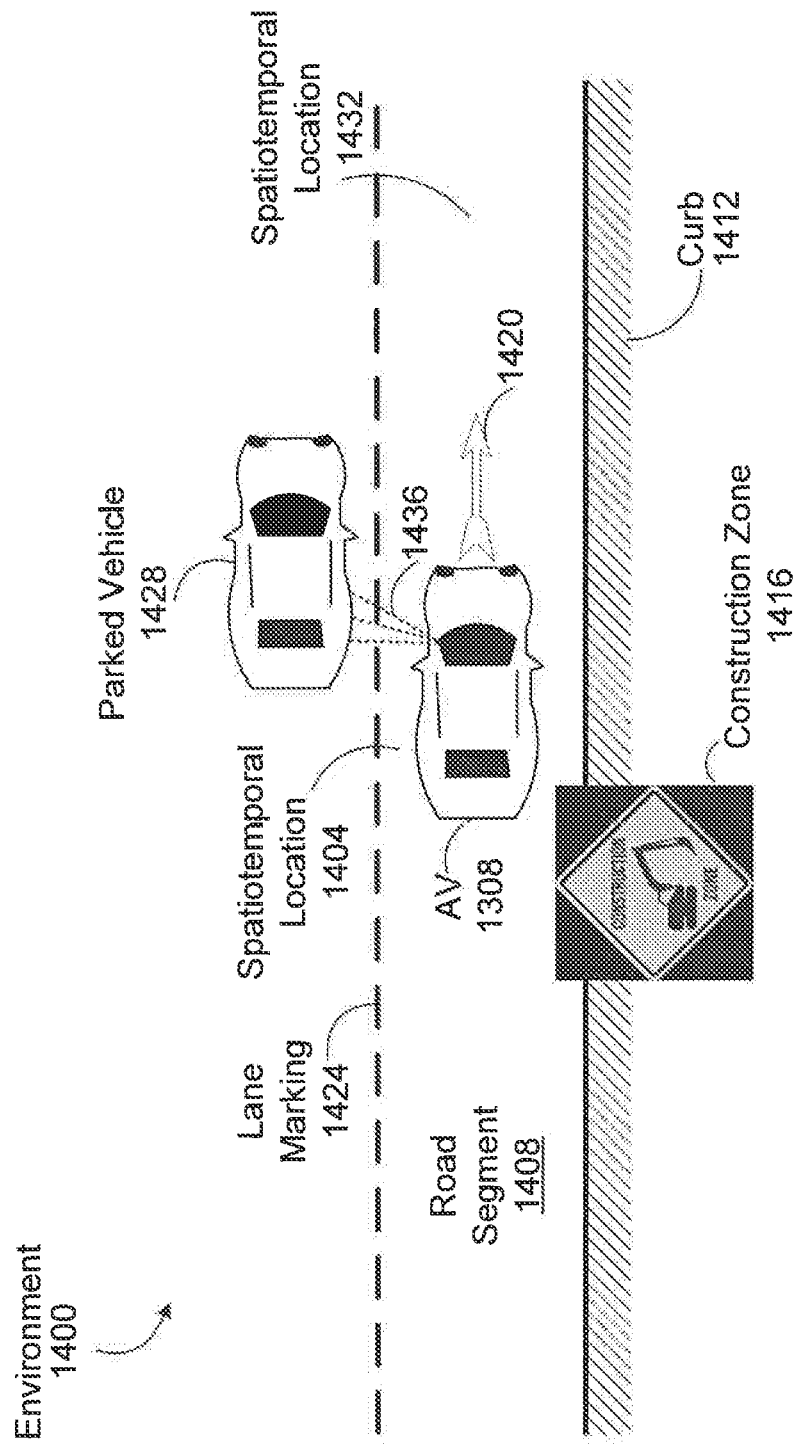
FIG. 14 illustrates an example environment for automatic annotation of environmental features in a map during navigation of a vehicle, in accordance with one or more embodiments.

FIG. 14 illustrates an example environment 1400 for automatic annotation of environmental features in a map 1364 during navigation of the AV 1308, in accordance with one or more embodiments. The environment 1400 includes a spatiotemporal location, 1404, at which the AV 1308 is located. The environment 1400 includes a road segment 1408, a curb 1412, a construction zone 1416, a road marking 1420 (directional arrow), a lane marking 1424 representing a boundary of the lane in which the AV 1308 is located, and a parked vehicle 1428 outside the lane.

The visual sensors 1336 of the AV 1308 generate sensor data 1344 representing the environment 1400 at the spatiotemporal location 1404. For example, the sensor data 1344 generated in FIG. 14 describes the shape, structure, and position of the curb 1412, the construction zone 1416, the road marking 1420, the lane marking 1424, or the parked vehicle 1428. The visual sensors 1336 include one or more monocular or stereo video cameras, infrared or thermal (or both) sensors, LiDAR 1436, RADAR, ultrasonic sensors, or time-of-flight (TOF) depth sensors, and may include temperature sensors, humidity sensors, or precipitation sensors. In one embodiment, the sensor data 1344 includes camera images, three-dimensional LiDAR point cloud data, or LiDAR point cloud data indexed in accordance with time.

The odometry sensors 1340 generate odometry data 1348 representing an operational state of the AV 1308. The AV 1308's odometry sensors 1340 include one or more GNSS sensors, IMUS that measure both vehicle linear accelerations and angular rates, wheel speed sensors for measuring or estimating wheel slip ratios, wheel brake pressure or braking torque sensors, engine torque or wheel torque sensors, or steering angle or angular rate sensors. The odometry data 1348 is associated with the spatiotemporal location 1404 and the road segment 1408. In one embodiment, the map annotator 1328 determines the location 1404 and a directional orientation of the AV 1308 using the odometry data 1348. The AV 1308 transmits the determined location coordinates and the directional orientation to the server 1312 or another vehicle 1316 to provide navigation assistance to the other vehicle 1316.

The map annotator 1328 annotates the map 1364 of the environment 1400 using the sensor data 1344. To annotate the map 1364, the map annotator 1328 generates a geometric model 1360 of an environmental feature from the sensor data 1344. For example, the environmental feature may represent a portion of the construction zone 1416 or the road marking 1420. In one embodiment, the extracting of the environmental feature includes generating a plurality of pixels, wherein a number of the plurality of pixels corresponds to a number of LiDAR beams 1436. The AV 1308 analyzes a depth difference between a first pixel of the plurality of pixels and neighboring pixels of the first pixel to extract the environmental feature.

To generate the geometric model 1360, the map annotator 1328 associates the feature with a drivable area within the environment 1400. The map annotator 1328 extracts a drivable segment, such as 1408, from the drivable area. The map annotator 1328 segregates the drivable segment into a plurality of geometric blocks, wherein each geometric block corresponds to a characteristic of the drivable area. The geometric model 1360 of the feature comprises the plurality of geometric blocks. In one embodiment, the map annotator 1328 generates the geometric model 1360 by superimposing the plurality of geometric blocks onto the sensor data 1344, such as the LiDAR point cloud data, to generate a polygon comprising a union of geometric blocks. The polygon models a feature of the environment 1400, such as a roundabout or intersection. In one embodiment, the map annotator 1328 generates the geometric model 1360 by mapping three-dimensional LiDAR point cloud data to a two-dimensional image. The map annotator 1328 extracts, from the two-dimensional image, edge pixels representing a shape of a target object 1416 using an edge operator for edge detection. The extracted edge pixels are assembled into an outline of the object 1416 using a transform to extract a polygon corresponding to the environmental feature. The map annotator 1328 annotates the geometric model 1360 using the semantic data and embeds the annotated geometric model 1360 within the map 1364.

In one embodiment, the map annotator 1328 associates the environmental feature with the odometry data 1348. Errors that might result from sensor noise during the AV 1308's estimation of its directional orientation and location 1404 are thereby reduced. The AV 1308 resolves such errors using the odometry data 1348 to close loops. For example, the AV 1308 recognizes when two different spatiotemporal locations, such as 1404 and 1432, have been incorrectly related and removes the relation between the two different spatiotemporal locations 1404 and 1432. The map annotator 1328 embeds a computer-readable semantic annotation corresponding to the geometric model 1360 within the live map 1364. The environmental feature is thereby represented by a geometric shape. For example, the shape may represent the construction zone 1416.

In one embodiment, the visual sensors 1336 generate second sensor data representing the environment 1400 when the AV 1308 is located at a second spatiotemporal location 1432 within the environment 1400. The AV 1308 associates the second sensor data with the second spatiotemporal location 1432 to make the second sensor data distinct from the sensor data 1344. The AV 1308 thereby generates a uniquely identifying signature for all the nodes (spatiotemporal locations) in the environment 1400. In one embodiment, the map annotator 1328 receives the LiDAR point cloud data and generates a base map on the basis of the LiDAR point cloud data. This map may have inaccuracies and errors in the form of misidentified loop closures. These errors are resolved by associating the second sensor data with the second spatiotemporal location 1432 using the odometry measurement data 1348 to close loops, for example, recognize when two nodes, such as 1404 and 1432, are incorrectly related and remove the relation of the two nodes.

Example Automatically Annotated Live Map for Navigation of an AV

Figure 15:
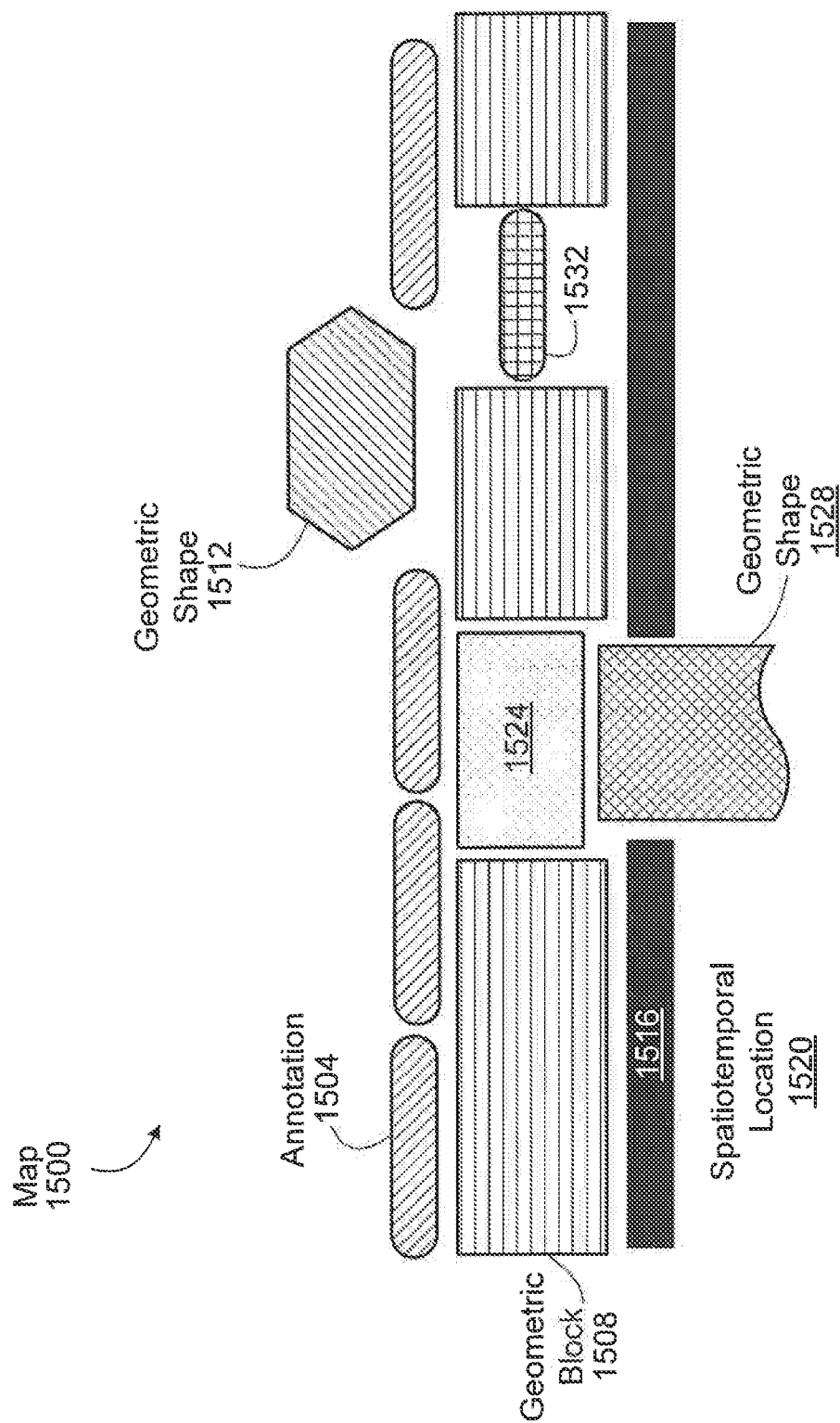
FIG. 15 illustrates example automatically annotated environmental features in a map during navigation of a vehicle, in accordance with one or more embodiments.

FIG. 15 illustrates example automatically annotated geometric models of environmental features in a live map 1500 during navigation of the AV 1308, in accordance with one or more embodiments. The map 1500 corresponds to the environment 1400 illustrated and described above with reference to FIG. 14. In the mapping mode, the geometric model annotator 1356 embeds an annotated geometric model 1360 of the lane marking feature 1424 in FIG. 14 as a computer-readable semantic annotation 1504 within the map 1500. The semantic annotation 1504 is a source of information that is easy to interpret, combine and reuse by the AV 1308, the server 1312, or the vehicle 1316 in FIG. 13. In one embodiment, the semantic annotation 1504 is a colored, structured digital marginalia that is machine-interpretable. The color or texture of the annotation 1504 enables the AV 1308 to perform operations such as classifying, linking, inferencing, searching, or filtering the map 1500. In the driving mode, the color of the feature 1504 may indicate to the AV 1308 that the feature 1504 is part of a lane marking 1424. Rules for staying within the lane are thereby enabled to navigate the AV 1308.

The geometric model annotator 1356 thereby enriches the map content with computer-readable information by linking the map 1500 to the extracted environmental features. For example, the geometric model generator 1352 associates a feature with a drivable area within the environment 1400. The feature may be an elevation or curve in the road segment 1408. The geometric model generator 1352 extracts the drivable segment 1408 from the drivable area. The geometric model generator 1352 segregates the drivable segment 1408 into a plurality of geometric blocks, such as 1508, 1524, etc. Each geometric block corresponds to a characteristic of the drivable area. For example, a geometric block may correspond to a portion of a surface, a portion of a structure, or a semantic description of an object 1324. Each geometric block is an informative and non-redundant representation of a physical or semantic characteristic of the drivable area. The geometric model of the feature comprises the plurality of geometric blocks. The lanes of the road segment 1408 that are orientated in the same direction may have the same annotations and color of the geometric block 1508. The direction of the lane is represented by the semantic annotation 1532, which is a representation of the road marking 1420 in FIG. 14.

In one embodiment, geometric blocks are superimposed onto the sensor data 1344 to generate a polygon. For example, a polygon such as a geometric shape 1512 is generated. This geometric shape 1512 represents the parked vehicle 1428. In the driving mode, the color or other annotation associated with the geometric shape 1512 indicates to the AV 1308 that the location of the parked vehicle 1428 is a parking spot. Each time the AV 1308 makes a subsequent visit to the road segment 1408 in the mapping mode, the AV 1308 searches for changes in the landscape and updates the map 1500. For example, the AV 1308 travels the environment 1400 multiple times in the mapping mode and may not observe the parked vehicle 1428 on some occasions. This is interpreted by the AV 1308's navigation system or the server 1312 to mean that the location of the parked vehicle 1428 may be occupied by another vehicle or not occupied at other times.

The map annotator 1328 embeds semantic metadata, markers, and custom annotations, such as 1516 in the map 1500. In the driving mode, the AV 1308 can use the annotation 1516 to determine a relationship between different spatiotemporal locations. For example, the AV 1308 determines that the annotation 1516 represents the curb 1412 in FIG. 2. Therefore, the AV 1308 should drive in the drivable region indicated by the geometric block 1508 and not drive in the spatiotemporal location 1520 on the other side of the curb.

In one embodiment, every location or place in the map 1500 is represented by latitude and longitude coordinates. In driving mode, the AV 1308 can thereby use a search-based methodology to determine a distance or path between two locations, such as 1404 and 1432 in FIG. 14. Traffic or driving information is added to and retrieved from the map 1500 by annotating each spatiotemporal location using semantic annotations. For example, the color of the semantic annotation 1524 indicates that the AV 1308 should slow down or otherwise exercise caution, such as increasing a lateral distance from the construction zone 1416 represented by the geometric shape 1528.

In some embodiments, one or more sensors 1336 of the AV 1308 are used to generate sensor data 1344 including a feature of the environment 1304. For example, a mapping mode may be used to collect data (e.g., LIDAR point data) by the sensors 1336 on the AV 1308 for extracting geometric profiles of features of interest. The sensor data 1344 is used to map the feature to a drivable area within a map 1500 of the environment 1304. Rules may be used to identify each feature of interest based on its geometric profile. The drivable area within the map 1500 is used to extract a polygon including a plurality of geometric blocks. Each geometric block (e.g., 1508) corresponds to a drivable segment of the drivable area. Geometric profiles of features of interest (e.g., boundaries, parked vehicles, traffic lights, street signs, etc.,) may thereby be extracted. Semantic data extracted from the drivable area within the map 1500 is used to annotate the polygon. Extracted features (e.g., identified parking spaces) may be automatically identified based on the geometric profile (polygon representation) of the blocks and segments. The map 1500 representation is thus annotated based on the identified features. One or more processors 146 of the AV 1308 are used to embed the annotated polygon within the map 1500.

In some embodiments, the extracting of the polygon includes superimposing the plurality of geometric blocks onto the sensor data 1344. A polygon representation is generated for each feature. The polygon representation is a union of the segments and/or blocks. A union of the superimposed plurality of geometric blocks is generated. Clusters of LIDAR point data are thereby classified into features (e.g., parked vehicles, intersections, etc.). In some embodiments, the drivable area within the map is used to extract the semantic data. The semantic data includes a logical driving constraint associated with navigating the AV 1308 along the drivable area. For example, an autonomous (mission) mode may be used to extract semantic annotations by the AV 1308 from the map 1500 representation to recognizes the position and pose of the AV 1308 relative to the map 1500 representation and determine the drivable area.

In some embodiments, the embedding of the annotated polygon within the map 1500 includes generating, from the annotated polygon, a computer-readable semantic annotation. The computer-readable semantic annotation is inserted into the map 1500. In some embodiments, the AV 1308 receives, from a second vehicle 1316, a second annotated polygon. From the second annotated polygon, a second computer-readable semantic annotation is generated. The second computer-readable semantic annotation is embedded into the map 1500. Annotations and partially updated maps may be uploaded from the AV 1500 on a network to the server 1312 when the AV 1308 is docked for charging. The server 1312 may merge updated real-time annotations from several different AVs into a live map representation.

In some embodiments, the sensor data 1344 includes three-dimensional LiDAR point cloud data. In some embodiments, the one or more sensors 1336 include a camera and the sensor data 1344 further includes an image of the feature. In some embodiments, the polygon represents a plurality of lanes of the drivable area orientated in the same direction. Each geometric block of the plurality of geometric blocks represents a single lane of the drivable area. In some embodiments, the polygon represents an elevation of the drivable area, a curb located adjacent to the drivable area, or a median separating two lanes of the drivable area. The drivable area may include a road, a parking space located on the road, a parking lot connected to the road, or a vacant lot.

In some embodiments, the sensor data 1344 is used to determine a spatial location of the AV 1308 relative to a boundary of the drivable area. The one or more sensors 1336 include a global navigation satellite system (GNSS) sensor or an inertial measurement unit (IMU). The determined spatial location of the AV 1308 relative to the boundary of the drivable area is used to operate the AV 1308 within the drivable area. In some embodiments, the polygon represents a splitting of a lane of the drivable area into a plurality of lanes. In some embodiments, the polygon represents a merging of a plurality of lanes of the drivable area into a single lane. In some embodiments, the polygon represents an intersection of a plurality of lanes of the drivable area. In some embodiments, the polygon represents a roundabout comprising a spatial location on the drivable area for the AV 1308 to enter or exit the roundabout.

In some embodiments, the polygon represents a curving of a lane of the drivable area. A control circuit 406 of the AV 1308 is used to operate the AV 1308 on the drivable area in an operating mode. The embedding of the annotated polygon is performed in a mapping mode. In some embodiments, the semantic data represents a marking on the drivable area, a road sign located within the environment, or a traffic signal located within the environment. In some embodiments, the logical driving constraint includes a traffic light sequence, a conditional left or right turn, or a direction of traffic. In some embodiments, the annotated polygon is extracted from the map 1500. A command is transmitted to a throttle 420b or a brake 420c of the AV 1308 responsive to the extracting of the annotated polygon.

Example Annotated Map

Figure 16:
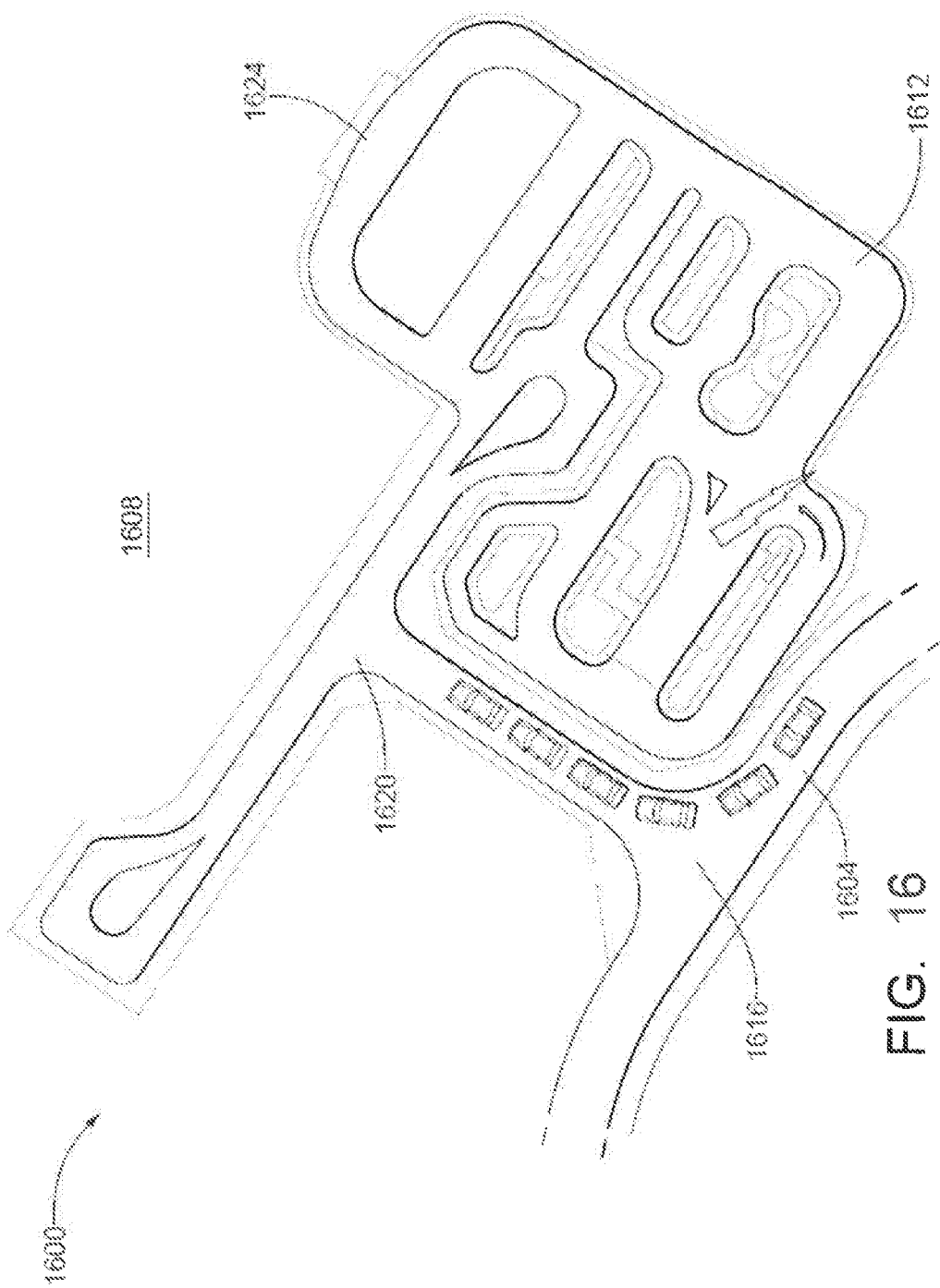
FIG. 16 illustrates an example automatically annotated map during navigation of a vehicle, in accordance with one or more embodiments.

FIG. 16 illustrates an example automatically annotated map 1600 during navigation of the AV 1308, in accordance with one or more embodiments. The map 1600 represents a drivable area 1604 and a non-drivable area 1608 mapped and annotated by the AV 1308. The generating of the geometric model, such as the geometric shape 1616, includes superimposing a plurality of geometric blocks onto the LiDAR point cloud data 1344 to generate the polygon 1616 that includes a union of the geometric blocks. The individual attributes of the plurality of geometric blocks are edited onto the LiDAR point cloud data 1344 to derive the polygon 1616 and visualize a spatial distribution of the union of the geometric blocks. The drivable area 1604 includes the road segment 1616, a left turn 1612, an intersection 1410, and an intersection 1624.

The polygon 1612 represents a stop line for the AV 1308. The stop line is coupled to a stop area that the AV 1308 is required to stop within. The AV 1308 retrieves the polygon 1612 from the map 1600 and recognizes that it is encountering a left turn. The stop line is associated with a road block connector illustrated in FIG. 16. The left turn stop line is associated with a pedestrian crossing.

The geometric shape 1616 represents a plurality of lanes of the drivable area 1604 orientated in the same direction. Each geometric block of the plurality of geometric blocks represents a single lane of the drivable area. The geometric model 1616 is therefore a block of lanes within a non-intersection road segment. The block of lanes 1616 has the same traffic direction within its area, such that, each lane has the same source edge and destination edge on a graph of the road network (see FIG. 10 illustrated above). Within the block of lanes 1616, a number of the lanes does not vary. The plurality of lanes 1616 share lane dividers within the drivable area and the block of lanes 1616 is expressed as a union, such as (lane 1) U (lane 2) U . . . U (lane N). A median or road divider feature separates the block of lanes 1616 from another block of lanes. The median or road divider separates blocks of lanes having different traffic directions. A lane divider feature separates two lanes having the same traffic direction.

The polygon 1620 represents an intersection of a plurality of lanes of the drivable area 1604. The intersection 1620 is associated with a sight triangle clear of obstructions in order for the AV 1308 to operate safely. At the intersection 1620, the basic right-of-way rules apply (either yield to the vehicle on the right, or the boulevard rule, depending on the location). The AV 1308 should be able to sense traffic approaching on the intersecting road at a point where the AV 1308 can adjust its speed or stop to yield to the other traffic. The intersection 1620 is defined as a junction of three or more roads. The polygon 1620 is composed of one or more road block connectors. The intersection 1620 is expressed as a union, such as (road block connector 1) U (road block connector 2) U . . . U (road block connector N).

In one embodiment, a feature represents an elevation of the drivable area 1604, a curb 1624 located adjacent to the drivable area 1604, or a median separating two lanes of the drivable area 1604. The curb 1624 is represented by a cross section of the roadway. The cross section includes the number of lanes, their widths, and cross slopes, as well as the presence or absence of shoulders, the curb 1624, sidewalks, drains, ditches, and other roadway features.

Process for Automatic Annotation of a Map

Figure 17:
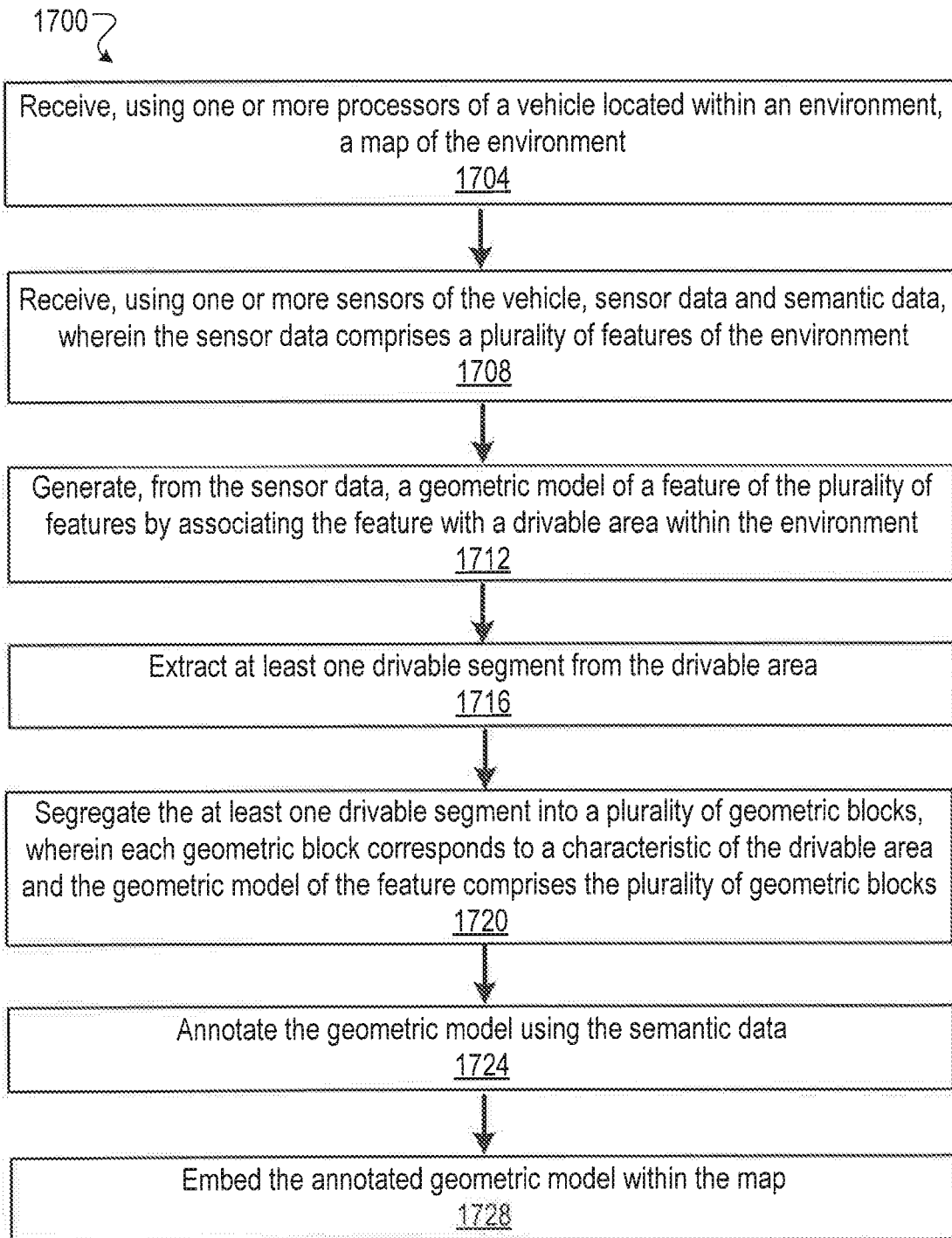
FIG. 17 illustrates a process for automatic annotation of environmental features in a map during navigation of a vehicle, in accordance with one or more embodiments.

FIG. 17 illustrates a process 1700 for automatic annotation of environmental features in a map 1364 during navigation of the AV 1308, in accordance with one or more embodiments. In one embodiment, the process of FIG. 17 is performed by one or more components of the AV 1308, such as the map annotator 1328. Other entities, such as the remote server 1312, perform some or all of the steps of the process 1700 in other embodiments. Likewise, embodiments may include different and/or additional steps, or perform the steps in different orders.

The AV 1308 receives 1704, using one or more processors of the AV 1308 located within an environment 1304, a map 1364 of the environment 1364. The environment 1304 represents a geographical area, such as a state, a town, a neighborhood, or a road network 1604 or segment 1616. The environment 1304 includes the AV 1308, and objects 1320, 1324. The objects are physical entities external to the AV 1308.

The AV 1308 receives 1708, using one or more sensors of the AV 1308, sensor data 1344 and semantic data. The sensor data 1344 comprises a plurality of features of the environment 1304. The sensors include one or more visual sensors 1336 such as monocular or stereo video cameras in the visible light, infrared or thermal (or both) spectra, LiDAR 1436, RADAR, ultrasonic sensors, or time-of-flight (TOF) depth sensors. In one embodiment, the sensor data 1344 includes camera images, three-dimensional LiDAR point cloud data, or LiDAR point cloud data indexed in accordance with time. The sensors also include odometry sensors 1340 to generate odometry data 1348 representing an operational state of the AV 1308. The AV 1308's odometry sensors 1340 include one or more GNSS sensors, IMUs that measure both vehicle linear accelerations and angular rates, wheel speed sensors for measuring or estimating wheel slip ratios, wheel brake pressure or braking torque sensors, engine torque or wheel torque sensors, or steering angle and angular rate sensors.

The AV 1308 generates 1712, from the sensor data 1344, a geometric model of a feature by associating the feature with a drivable area 1604 within the environment 1304. In one embodiment, the AV 1308 uses statistical methods to associate the feature (structure) with the drivable area 1604 based on the sensor data 1344's 2D structure. The RGB pixel values of the feature are extracted from the sensor data 1344 and combined using a statistical model to obtain a higher-order architecture. For example, a texture of the drivable area is determined by minimizing the variance of small areas within the sensor data 1344 based on a histogram of a road network.

The AV 1308 extracts 1716 a drivable segment from the drivable area 1604. The drivable segment is correlated to the extracted feature based on the spatiotemporal location of the AV 1308. In one embodiment, the AV 1308 uses cues such as color and lane markings to extract the drivable segment. The AV 1308 further uses the LiDAR points' spatial information to analyze the drivable area 1604 and correlate segments of the drivable area to the feature. In one embodiment, the AV 1308 fuses image data and LiDAR points of the feature to perform the correlating.

The AV 1308 segregates 1720 the drivable segment into a plurality of geometric blocks. Each geometric block corresponds to a characteristic of the drivable area 1604. A characteristic of the drivable area 1604 refers to a positioning of the physical elements of a roadway, defined by alignment, profile, or cross section of the drivable area 1604. Alignment is defined as a series of horizontal tangents and curves of the drivable area 1604. Profile is a vertical aspect of the road, including crest and sag curves. Cross section illustrates positions and a number of vehicles, bicycle lanes, or walkways. The geometric model 1360 of the feature comprises the plurality of geometric blocks.

The AV 1308 annotates 1724 the geometric model 1360 using the semantic data. The AV 1308 performs semantic annotation to label pixels or portions of the geometric model 1360 or feature using the semantic data. The semantic annotation provides an understanding of the pixels and portions of the feature or geometric model 1360. In one embodiment, the AV 1308 annotates the geometric model 1360 by generating a computer-readable semantic annotation that combines the geometric model 1360 and the semantic data. To perform the annotation, the AV 1308 associates each pixel of the geometric model 1360 with a class label (such as "yield sign," "no right turn," or "parked vehicle").

The AV 1308 embeds 1728 the annotated geometric model 1360 within the live map 1364. The AV 1308 embeds the semantic annotation such that it becomes a source of information that is easy to interpret, combine and reuse by the AV 1308, the server 1312, or the vehicle 1316. For example, the semantic annotation may be a structured digital marginalia that is invisible in the human-readable part of the map 1364. Because the semantic annotation is machine-interpretable, the semantic annotation enables the AV 1308 to perform operations such as classifying, linking, inferencing, searching, or filtering the map 1364. The AV 1308 thereby enriches the map content with computer-readable information by linking the map 1364 to the extracted environmental features.

Process for Automatic Annotation of a Map

Figure 18:
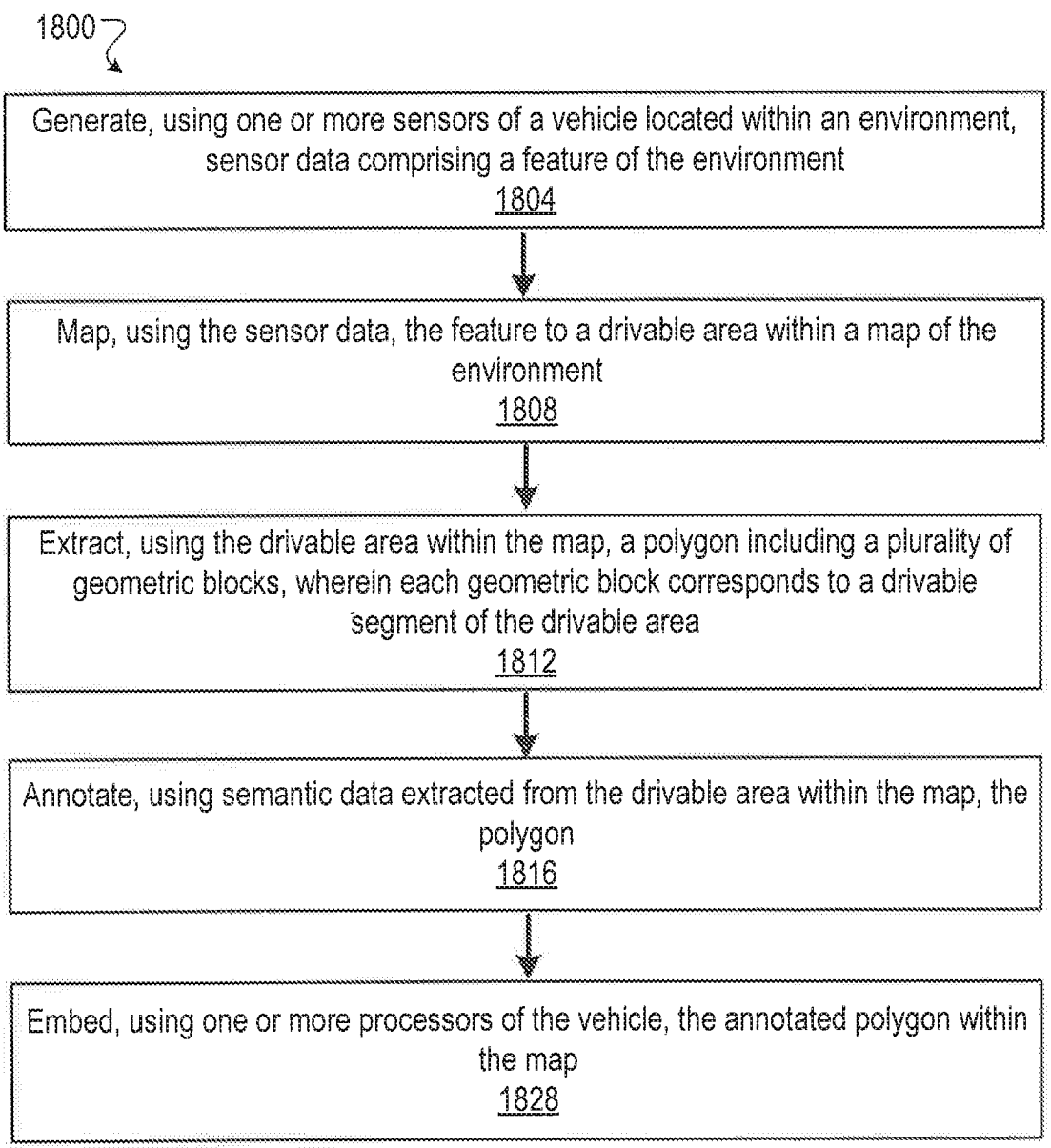
FIG. 18 illustrates a process for automatic annotation of environmental features in a map during navigation of a vehicle, in accordance with one or more embodiments.

FIG. 18 illustrates a process 1800 for automatic annotation of environmental features in a map 1364 during navigation of the AV 1308, in accordance with one or more embodiments. In one embodiment, the process of FIG. 18 is performed by one or more components of the AV 1308, such as the map annotator 1328. Other entities, such as the remote server 1312, perform some or all of the steps of the process 1800 in other embodiments. Likewise, embodiments may include different and/or additional steps, or perform the steps in different orders.

The AV 1308 generates 1804, using one or more sensors 1336, sensor data 1344 comprising a feature of an environment 1304. The sensors include one or more visual sensors 1336 such as monocular or stereo video cameras in the visible light, infrared or thermal (or both) spectra, LiDAR 1436, RADAR, ultrasonic sensors, or time-of-flight (TOF) depth sensors. In one embodiment, the sensor data 1344 includes camera images, three-dimensional LiDAR point cloud data, or LiDAR point cloud data indexed in accordance with time. The environment 1304 represents a geographical area, such as a state, a town, a neighborhood, or a road network 1604 or segment 1616. The environment 1304 includes the AV 1308, and objects 1320, 1324. The objects are physical entities external to the AV 1308.

The AV 1308 maps 1808, using the sensor data 1344, the feature to a drivable area within a map 1500 of the environment 1304. The drivable area may include a road segment of the environment 1304, a parking space located on the road segment, a parking lot connected to the road segment, or a vacant lot located within the environment 1304. In an embodiment, the drivable area includes off-road trails and other unmarked or undifferentiated pathways that are traversable by the AV 1308.

The AV 1308 extracts 1812, using the drivable area within the map 1500, a polygon including a plurality of geometric blocks. Each geometric block corresponds to a drivable segment of the drivable area. The individual attributes of the geometric blocks may be edited onto the LiDAR point cloud data 1344 to derive the polygon and visualize a spatial distribution of a union of the geometric blocks. For example, the drivable area can include a road segment, a parking space located on the road segment, a parking lot connected to the road segment, or a vacant lot located within the environment. A geometric model representing a portion of the drivable area, therefore, is a polygon including one or more road segments.

The AV 1308 annotates 1816, using semantic data extracted from the drivable area within the map 1500, the polygon. The AV 1308 performs semantic annotation to label pixels or portions of the polygon using the semantic data. The semantic annotation provides an understanding of the pixels and portions of the polygon. In one embodiment, the AV 1308 annotates the polygon by generating a computer-readable semantic annotation that combines the polygon and the semantic data. To perform the annotation, the AV 1308 associates each pixel of the polygon with a class label (such as "yield sign," "no right turn," or "parked vehicle").

The AV 1308 embeds 1828 embeds, using one or more processors 146 of the AV 1308, the annotated polygon within the map 1500. The AV 1308 embeds the annotated polygon such that it becomes a source of information that is easy to interpret, combine and reuse by the AV 1308, the server 1312, or the vehicle 1316. For example, the annotated polygon may be a structured digital marginalia that is invisible in the human-readable part of the map 1500. Because the annotated polygon is machine-interpretable, the annotated polygon enables the AV 1308 to perform operations such as classifying, linking, inferencing, searching, or filtering the map 1500. The AV 1308 thereby enriches the map content with computer-readable information by linking the map 1500 to the extracted environmental features.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further including," in the foregoing description or following claims, what follows this phrase can be an additional step or entity, or a sub-step/sub-entity of a previously-recited step or entity.

What is claimed is:

1. A method for automatic annotation of environmental features in a map during navigation of a vehicle, the method comprising:
receiving, using one or more processors of a vehicle located within an environment, the map of the environment;
receiving, using one or more sensors of the vehicle, sensor data and semantic data, wherein the one or more sensors of the vehicle are sensors for sensing or measuring properties of the vehicle's environment, wherein the sensor data comprises LiDAR point cloud data, wherein the one or more sensors comprises a camera, and wherein the sensor data further comprises an image of the plurality of features of the environment;
extracting, from the sensor data, a plurality of features of the environment, each feature representing one or more characteristics, such as a physical or semantic aspect, of the environment, wherein the semantic data are extracted from images taken by the cameras within the sensors using image processing from the sensor data;
generating, from the sensor data using the one or more processors, a geometric model of a feature of the plurality of features, the generating comprising:
associating, using the one or more processors, the feature with a drivable area within the environment;
extracting, using the one or more processors, at least one drivable segment from the drivable area using superpixel classification of the image taken by the camera;
classifying the LiDAR point cloud data;
segregating, using the one or more processors, by using spectral segmentation based on intensity values or RGB values of the classified LiDAR point cloud data, the at least one drivable segment into a plurality of geometric blocks, wherein each geometric block of the plurality of geometric blocks corresponds to a characteristic of the drivable area, wherein the characteristic of the drivable area refers to a positioning of a physical element of a roadway, defined by alignment, profile, and cross-section of the drivable area, and wherein the geometric model of the feature comprises the plurality of geometric blocks; and
superimposing, using the one or more processors, the plurality of geometric blocks onto the LiDAR point cloud data to generate a polygon comprising a union of geometric blocks of the plurality of geometric blocks;
annotating, using the one or more processors, the geometric model using the semantic data;
embedding, using the one or more processors, the annotated geometric model within the map;
storing a plurality of operational metrics associated with navigating the vehicle along the drivable area;
updating, using the map, the plurality of operational metrics;
determining, using the updated plurality of operational metrics, rerouting information for the vehicle; and
transmitting the rerouting information to a server or another vehicle located within the environment.

2. The method of claim 1, wherein the vehicle is located at a spatiotemporal location within the environment, the plurality of features associated with the spatiotemporal location.

3. The method of claim 1, wherein the feature represents a plurality of lanes of the drivable area, each lane of the plurality of lanes orientated in a same direction, each geometric block of the plurality of geometric blocks representing a single lane of the plurality of lanes.

4. The method of claim 1, wherein the feature represents at least one of an elevation of the drivable area, a curb located adjacent to the drivable area, or a median separating two lanes of the drivable area.

5. The method of claim 1, wherein the drivable area comprises at least one of a road segment, a parking space located on the road segment, a parking lot connected to the road segment, or a vacant lot located within the environment.

6. The method of claim 1, further comprising determining, using the sensor data, a spatial location of the vehicle relative to a boundary of the drivable area, the one or more sensors comprising a global navigation satellite system (GNSS) sensor or an inertial measurement unit (IMU).

7. The method of claim 1, wherein the polygon represents a splitting of a lane of the drivable area into a plurality of lanes.

8. The method of claim 1, wherein the polygon represents a merging of a plurality of lanes of the drivable area into a single lane.

9. The method of claim 1, wherein the polygon represents an intersection of a plurality of lanes of the drivable area.

10. The method of claim 1, wherein the polygon represents a roundabout comprising a spatial location on the drivable area for the vehicle to enter or exit the roundabout.

11. The method of claim 1, wherein the polygon represents a curving of a lane of the drivable area.

12. The method of claim 1, wherein the annotating of the geometric model comprises generating a computer-readable semantic annotation that combines the geometric model and the semantic data, the method further comprising transmitting, to a remote server or another vehicle, the map having the computer-readable semantic annotation.

13. The method of claim 1, wherein the annotating of the geometric model using the semantic data is performed in a first mode of operation, the method further comprising navigating, using a control module of the vehicle, the vehicle on the drivable area in a second mode of operation using the map.

14. The method of claim 1, wherein the semantic data represents at least one of a marking on the drivable area, a road sign located within the environment, or a traffic signal located within the environment.

15. The method of claim 1, wherein the annotating of the geometric model using the semantic data comprises extracting, from the semantic data, a logical driving constraint associated with navigating the vehicle within the drivable area.

16. A vehicle comprising:
one or more computer processors; and
one or more non-transitory storage media storing instructions which, when executed by the one or more computer processors, cause the one or more computer processors to:
receive a map of an environment that the vehicle is located within;
receive, using one or more sensors of the vehicle, sensor data and semantic data, wherein the one or more sensors of the vehicle are sensors for sensing or measuring properties of the vehicle's environment, wherein the sensor data comprises LiDAR point cloud data, wherein the one or more sensors comprises a camera, and wherein the sensor data further comprises an image of the plurality of features of the environment;

extract, from the sensor data, a plurality of features of the environment, each feature representing one or more characteristics, such as a physical or semantic aspect, of the environment, wherein the semantic data are extracted from images taken by the cameras within the one or more sensors using image processing from the sensor data;

generate, from the sensor data, a geometric model of a feature of the plurality of features, the generating comprising:
associating the feature with a drivable area within the environment;
extracting at least one drivable segment from the drivable area using superpixel classification of the image taken by the camera;
classifying the LiDAR point cloud data;
segregating, by using spectral segmentation based on intensity values or RGB values of the classified LiDAR point cloud data, the at least one drivable segment into a plurality of geometric blocks, wherein each geometric block of the plurality of geometric blocks corresponds to a characteristic of the drivable area, wherein the characteristic of the drivable area refers to a positioning of a physical element of a roadway, defined by alignment, profile, and cross-section of the drivable area, and wherein the geometric model of the feature comprises the plurality of geometric blocks; and
superimposing the plurality of geometric blocks onto the LiDAR point cloud data to generate a polygon comprising a union of geometric blocks of the plurality of geometric blocks;

annotate the geometric model using the semantic data;
embed the annotated geometric model within the map;
store a plurality of operational metrics associated with navigating the vehicle along the drivable area;
update, using the map, the plurality of operational metrics;
determine, using the updated plurality of operational metrics, rerouting information for the vehicle; and
transmit the rerouting information to a server or another vehicle located within the environment.

17. One or more non-transitory storage media storing instructions which, when executed by one or more computing devices, cause the computing devices to:
receive a map of an environment that a vehicle is located within;
receive, using one or more sensors of the vehicle, sensor data and semantic data, wherein the one or more sensors of the vehicle are sensors for sensing or measuring properties of the vehicle's environment, wherein the sensor data comprises LiDAR point cloud data, wherein the one or more sensors comprises a camera, and wherein the sensor data further comprises an image of the plurality of features of the environment;

extract, from the sensor data, a plurality of features of the environment, each feature representing one or more characteristics, such as a physical or semantic aspect, of the environment, wherein the semantic data are extracted from images taken by the cameras within the sensors using image processing from the sensor data;

generate, from the sensor data, a geometric model of a feature of the plurality of features, the generating comprising:
associating the feature with a drivable area within the environment;
extracting at least one drivable segment from the drivable area using superpixel classification of the image taken by the camera;
classifying the LiDAR point cloud data;
segregating, by using spectral segmentation based on intensity values or RGB values of the classified LiDAR point cloud data, the at least one drivable segment into a plurality of geometric blocks, wherein each geometric block of the plurality of geometric blocks corresponds to a characteristic of the drivable area, wherein the characteristic of the drivable area refers to a positioning of a physical element of a roadway, defined by alignment, profile, and cross-section of the drivable area, and wherein the geometric model of the feature comprises the plurality of geometric blocks; and
superimposing the plurality of geometric blocks onto the LiDAR point cloud data to generate a polygon comprising a union of geometric blocks of the plurality of geometric blocks;

annotate the geometric model using the semantic data;
embed the annotated geometric model within the map;
store a plurality of operational metrics associated with navigating the vehicle along the drivable area;
update, using the map, the plurality of operational metrics;
determine, using the updated plurality of operational metrics, rerouting information for the vehicle; and
transmit the rerouting information to a server or another vehicle located within the environment.

* * * * *